US011938887B2

(12) United States Patent
Saito et al.

(10) Patent No.: US 11,938,887 B2
(45) Date of Patent: Mar. 26, 2024

(54) PASSENGER RESTRAINING DEVICE

(71) Applicant: Autoliv Development AB, Vargarda (SE)

(72) Inventors: Hiroyuki Saito, Kanagawa (JP); Tetsuya Matsushita, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 266 days.

(21) Appl. No.: 16/767,316

(22) PCT Filed: Nov. 28, 2018

(86) PCT No.: PCT/JP2018/043743
§ 371 (c)(1),
(2) Date: May 27, 2020

(87) PCT Pub. No.: WO2019/107398
PCT Pub. Date: Jun. 6, 2019

(65) Prior Publication Data
US 2020/0406855 A1 Dec. 31, 2020

(30) Foreign Application Priority Data

Nov. 30, 2017 (JP) ................................. 2017-229934
Mar. 13, 2018 (JP) ................................. 2018-045485

(51) Int. Cl.
*B60R 21/2338* (2011.01)
*B60R 21/207* (2006.01)
*B60R 21/231* (2011.01)

(52) U.S. Cl.
CPC ........ *B60R 21/2338* (2013.01); *B60R 21/207* (2013.01); *B60R 21/23138* (2013.01);
(Continued)

(58) Field of Classification Search
CPC .............. B60R 21/2338; B60R 21/207; B60R 21/23138; B60R 2021/23146; B60R 2021/23386
See application file for complete search history.

(56) References Cited

U.S. PATENT DOCUMENTS 5,636,862 A 6/1997 Cheung et al.
6,029,993 A * 2/2000 Mueller .............. B60R 21/2338
280/730.2
(Continued)

FOREIGN PATENT DOCUMENTS

JP 2009-29182 A 2/2009
JP 2014-12495 A 1/2014
(Continued)

OTHER PUBLICATIONS

JP-2014012495-A (machine translation) (Year: 2014).*
(Continued)

*Primary Examiner* — Jason D Shanske
*Assistant Examiner* — Joselynn Y Sliteris
(74) *Attorney, Agent, or Firm* — Harness, Dickey & Pierce, P.L.C.; Stephen T. Olson

(57) ABSTRACT

Problem:
To more effectively restrict movement of the airbag in an expanded and deployed state in the event of a vehicle collision, and improve the performance of restraining a passenger using an airbag.
Resolution Means:
A passenger restraining device of the present invention is provided with an airbag and tensile cloth. The tensile cloth is deployed to the outside of a seat by expansion and deployment of the airbag, and pulled from an upper surface of a seat back portion to a seat cushion portion. When the airbag is viewed in plan view from above during the expansion and deployment, of four regions demarcated by a
(Continued)

first imaginary line extending in a front-rear direction of a vehicle through a center of a widest portion of the airbag on a straight line parallel to a left-right direction and a second imaginary line orthogonal to the first imaginary line and extending in the left-right direction through a center of the first imaginary line in a front-rear length of the airbag, the tension cloth passes through at least a region on an opposite side of the first imaginary line from the passenger and a vehicle front side of the second imaginary line.

14 Claims, 14 Drawing Sheets

(52) U.S. Cl.
 CPC ............... *B60R 2021/23146* (2013.01); *B60R 2021/23386* (2013.01)

(56) References Cited

U.S. PATENT DOCUMENTS

| | | | | |
|---|---|---|---|---|
| 8,690,187 | B2* | 4/2014 | Fukawatase | B60R 21/207 280/730.2 |
| 8,899,619 | B2* | 12/2014 | Fukawatase | B60R 21/207 280/730.2 |
| 9,193,326 | B2 | 11/2015 | Fukawatase | |
| 9,238,425 | B2* | 1/2016 | Fukawatase | B60N 2/4235 |
| 2014/0042733 | A1 | 2/2014 | Fukawatase | |
| 2014/0062069 | A1 | 3/2014 | Fukawatase | |

FOREIGN PATENT DOCUMENTS

| | | | |
|---|---|---|---|
| JP | 2014012475 A | * | 1/2014 |
| JP | 2014012495 A | * | 1/2014 |
| JP | 2014-034356 A | | 2/2014 |
| JP | 2014-51138 A | | 3/2014 |

OTHER PUBLICATIONS

International Search Report of the International Searching Authority for PCT/JP2018/040867 dated Jan. 15, 2019.
English translation of International Search Report of the International Searching Authority for PCT/JP2018/040867 dated Jan. 15, 2019.
International Search Report of the International Searching Authority for PCT/JP2018/043743 dated Jan. 15, 2019.
English translation of International Search Report of the International Searching Authority for PCT/JP2018/043743 dated Jan. 15, 2019.

* cited by examiner (a)

(b)

(c)

(a)

(b)

(c)

(a)

(b)

(c)

(a)

(b)

(a)

(b)

(a)

(b)

(a)

(b)

(a)

(b)

(a)

(b)

PASSENGER RESTRAINING DEVICE

TECHNICAL FIELD

The present invention relates to a passenger restraining device that restrains a passenger sitting on a seat of a vehicle.

BACKGROUND

Airbag devices have generally become standard equipment in vehicles in recent years. An airbag device is a safety device which is operated in case of an emergency such as a vehicle collision and, for example, expands and deploys to protect the passenger. There are various types of airbag devices depending on the installation site and application. For example, a side airbag that expands and deploys to immediate sides of a passenger on both side of a seat is provided in a passenger protecting device in Patent Document 1. According to Patent Document 1, movement to an opposite side of a collision (second side in a vehicle width direction) due to rebounding or the like from a movement to a collision side (first side in a vehicle width direction) at the time of collision can be restricted.

RELATED ART DOCUMENTS

Patent Documents

Patent Document 1: Japanese Unexamined Patent Application Publication No. 2014-034356

SUMMARY OF THE INVENTION

Problem to be Solved by the Invention

With the airbag device that laterally stops a passenger as described in Patent Document 1, when the airbag moves in a direction away from the passenger in the vehicle width direction, the ability to restrain the passenger may deteriorate. Therefore, in Patent Document 1, a tension cloth device is provided on an inner side portion of an inner airbag in the vehicle width direction. The tension cloth device of Patent Document 1 has a tension cloth as a side deployment member and a pop-up structure as deploying means.

According to a configuration in Patent Document 1, movement on the inner airbag in the vehicle width direction is suppressed based on support by the tension cloth provided on the inner side portion in the vehicle width direction. Therefore, movement of the passenger in the vehicle width direction is considered to be restricted. However, with the configuration in Patent Document 1, only a side surface of the inner airbag is supported by the tension cloth. Therefore, movement of the airbag in the vehicle front-rear direction cannot be restricted. Thus, there is still room for improvement in the passenger protecting device in Patent Document 1.

In view of the foregoing, an object of the present invention is to provide a passenger restraining device that can more effectively restrict movement of the airbag in an expanded and deployed state in the event of a vehicle collision, and improve the performance of restraining a passenger using an airbag.

Means for Solving the Problem

In order to solve the aforementioned problem, a representative configuration of a passenger restraining device according to the present invention is a passenger restraining device that restrains a passenger sitting on a seat of a vehicle. The passenger restraining device contains: at least one airbag that is at least partially stored in a seat back portion of the seat and expands and deploys to a side of a passenger sitting on the seat; and at least one tensile cloth stored from a seat back portion of the seat to a seat cushion portion through a side surface of the airbag on a side opposite from the passenger. The tensile cloth is deployed to the outside of the seat by expanding and deploying the airbag, and is stretched from an upper surface of the seat back portion to the seat cushion portion. When the airbag is viewed in plan view from above during the expansion and deployment, of four regions demarcated by a first imaginary line extending in a front-rear direction of a vehicle through a center of a widest portion of the airbag on a straight line parallel to a left-right direction and a second imaginary line orthogonal to the first imaginary line and extending in the left-right direction through a center of the first imaginary line in a front-rear length of the airbag, the tensile cloth passes through at least a region on an opposite side of the first imaginary line from the passenger and a vehicle front side of the second imaginary line.

With this configuration, the airbag is expanded and deployed at the time of a collision of a vehicle such that the tensile cloth is deployed outside of the seat. Thereby, the tensile cloth is stretched to a side surface of the seat cushion portion along a side surface of the airbag on an opposite side from the passenger. The tensile cloth deployed outside of the seat passes through the region on the opposite side of the passenger of the first imaginary line of the airbag and on the vehicle front side of the second imaginary line. Thereby, the tensile cloth is stretched diagonally to the airbag in a direction away from the passenger towards front of the vehicle. The surface on the opposite side of the passenger and front side of the airbag are maintained by the stretched tensile cloth. Therefore, both movement away from the passenger and forward movement can be restricted, thereby enabling improvement of passenger restraining ability performance of the airbag.

In order to solve the aforementioned problem, another configuration of the passenger restraining device according to the present invention is a passenger restraining device that restrains a passenger sitting on a seat of a vehicle, containing: at least one airbag that is at least partially stored in a seat back portion of the seat and expands and deploys to a side of a passenger sitting on the seat; and at least one tensile cloth stored from a seat back portion of the seat to a seat cushion portion through a side surface of the airbag on a side opposite from the passenger. The tensile cloth is deployed to the outside of the seat by expanding and deploying the airbag, and is stretched from an upper surface of the seat back portion to the seat cushion portion. When the airbag is viewed in plan view from above during the expansion and deployment, of four regions demarcated by a first imaginary line extending in a front-rear direction of a vehicle through a centroid as a center of gravity of a plane figure and a second imaginary line orthogonal to the first imaginary line and extending in the left-right direction, the tensile cloth passes through at least a region on an opposite side of the first imaginary line from the passenger and a vehicle front side of the second imaginary line.

With this configuration, the first imaginary line is a line segment that passes through a centroid in plan view from above the airbag. Even with this configuration, the tensile cloth deployed in the outside of the seat passes through the region on the opposite side of the first imaginary line of the airbag from the passenger and the vehicle front side of the second imaginary line, and therefore, a similar effect as described above can be achieved.

An attachment point of the tensile cloth on the upper surface of the seat back portion is preferably in a vicinity more inside than a shoulder portion of the passenger in the left-right direction. As a result, the tensile cloth exerts a force on the airbag in a direction toward the passenger side in the vicinity of the shoulder portion of the passenger. Therefore, movement of the airbag in a direction away from the passenger can be more effectively restricted.

The tensile cloth preferably deploys outside of the seat based on a skin of the seat splitting open during expansion and deployment of the airbag. Alternatively, at least a portion of the tensile cloth is preferably stored in a case provided to a side of the seat, and preferably deploys from the case to the outside of the seat during expansion and deployment of the airbag. With any of the configurations, the aforementioned effect can be favorably achieved.

The width of the tensile cloth preferably increases towards the seat cushion portion from the seat back portion. With this configuration, the tensile cloth can maintain the airbag in a wider area. Therefore, movement of the airbag can be more reliably restricted, and the aforementioned effect can be increased.

A plurality of the tensile cloths is preferably provided. Thereby, the number of points where the tensile cloths maintain the airbag can be increased. Therefore, movement of the airbag can be more reliably restricted, and the aforementioned effect can be increased.

The tensile cloth as viewed in plan view from above the airbag during expansion and deployment preferably intersects with a contour line of the airbag in a region on an opposite side of the first imaginary line from the passenger and the vehicle front side of the second imaginary line. With this configuration, even if the tensile cloth intersects the region on the opposite side of the first imaginary line from the passenger and vehicle front side of the second imaginary line, the aforementioned effect can be achieved.

The at least one airbag is preferably provided on both sides of the seat, and is preferably configured of a pair of airbags that expand and deploy to the left and right of the passenger sitting on the seat. As a result, both left and right sides of the passenger can be restrained by the airbag, and thus a higher passenger restraining performance can be achieved.

The passenger restraining device preferably further contains a biasing mechanism embedded in the seat back portion, which biases one airbag of the pair of airbags to the passenger side. The biasing mechanism preferably contains: a shaft disposed at a position corresponding to a shoulder portion of the passenger on the one airbag side in the seat back portion and that is capable of sliding that seat back portion in the left-right direction; and a tether connected to the shaft and an airbag on an opposite side from the one airbag. The tensile cloth is preferably secured to the seat back portion at a position on an inner side of the shaft in the left-right direction. During expansion and deployment of the pair of airbags, the tensile cloth is preferably deployed to the outside of the seat, and is preferably stretched to the seat cushion portion from a vicinity more inside than a shoulder portion of the passenger in the left-right direction of the upper surface of the seat back portion. When the tether is deployed to the outside of the seat during expansion and deployment of the pair of airbags, the tether is preferably pulled by the opposite side airbag, and the shaft preferably moves the seat back portion to a position corresponding to the other shoulder portion of the passenger, such that the tensile cloth is pulled by the shaft, and the one airbag is biased to the passenger.

With this configuration, the biasing mechanism biases the one airbag provided thereby to the passenger. Thereby, an effect of suppressing movement of the airbag in the left-right direction by the tensile cloth can be increased. Therefore, passenger restraining performance by the airbag can be further improved.

The passenger restraining device preferably further contains a biasing mechanism embedded in the seat back portion, which biases one airbag of the pair of airbags to the passenger side. The biasing mechanism preferably contains: an annular slide ring disposed at a position corresponding to a shoulder portion of the passenger on one airbag side in the seat back portion and through which the tensile cloth is inserted and can move forward; and a tether connected to the slide ring and an airbag on an opposite side from the one airbag. The tensile cloth is preferably inserted through the slide ring and then secured to the seat back portion. During expansion and deployment of the pair of airbags, the tensile cloth is preferably deployed to the outside of the seat, and is preferably stretched to the seat cushion portion from a vicinity more inside than a shoulder portion of the passenger in the left-right direction of the upper surface of the seat back portion. The tether and slide ring are preferably exposed to the outside of the seat during expansion and deployment of the pair of airbags, the tether is preferably pulled and the slide ring moves forward by the opposite side airbag, and the slide ring preferably separates from the position where the tensile cloth is secured to the seat back portion, such that the tensile cloth is pulled, and the one airbag is biased to the passenger.

With this configuration, the effect of biasing one airbag to the passenger can also be achieved similar to the aforementioned biasing mechanism. Therefore, passenger restraining performance by the airbag can be further increased.

The tensile cloth and biasing mechanism are preferably provided for both of the pair of airbags. With this configuration, an effect based on the biasing mechanism can be achieved in both pair of airbags. Therefore, passenger restraining performance can be further increased.

The tensile cloth and biasing mechanism are preferably provided for both of the pair of airbags, and the slide rings of the biasing mechanism provided on both are preferably connected. Thereby, the biasing mechanism provided for each of the pair of airbags can be connected.

The tensile cloth is preferably connected to the airbag at an intermediate portion of the tensile cloth more forward then a center in the front-rear length when viewed in plan view from above the airbag during expansion and deployment. Thereby, the tensile cloth can catch the airbag during expansion and deployment in a well balanced manner in the front-rear direction. Therefore, the aforementioned effect can be stably achieved.

The passenger restraining device preferably further contains a biasing mechanism embedded inside the seat back portion, which biases the airbag to the passenger side. The biasing mechanism preferably contains a retractor that is connected to one end of the tensile cloth and winds the tensile cloth. The tensile cloth is preferably wound by the retractor during expansion and deployment of the airbag, such that the airbag is biased to the passenger side. Examples of a retractor that can be used include electric motor refractors or retractors with a similar structure known as a general seatbelt retractor where a spindle of a retractor is rapidly rotated by gas pressure generated by a gas generating device such as a macro gas generator or the like.

With this configuration, the effect of biasing the airbag to the passenger can also be achieved similar to the aforementioned biasing mechanism. Therefore, passenger restraining performance by the airbag can be further increased. Furthermore, with this configuration, even if only one airbag is provided without providing a pair of airbags, an effect of biasing the airbag to the passenger can be achieved.

The tensile cloth preferably contains: a first tensile cloth; and a second tensile cloth. The first tensile cloth preferably passes through at least a region on a side opposite of the first imaginary line from the passenger, and on a vehicle front side of the second imaginary line above the airbag from an upper portion of a seat back. The second tensile cloth preferably passes above the airbag more rearward than the first tensile cloth and is connected to a seat cushion. Furthermore, the biasing mechanism preferably contains a direction changing part that changes a direction of pulling the first tensile cloth and second tensile cloth between the retractor and the airbag.

With this configuration, in a configuration where two tensile cloths are provided, the two tensile cloths are merged together at the direction changing part during expansion and deployment of the airbag. The pulling direction of the merged tensile cloths is changed by the direction changing part that supports the tensile cloths on the way to the retractor, and then the tensile cloths are wound around the retractor. Thereby, the two tensile cloths can be simultaneously wound around the retractor without entangling, and therefore, the aforementioned effect can be stably achieved even in a configuration where two or more tensile cloths are provided.

Note that the direction changing part may, for example, have a rod shape such as a pin, may be a long and thin slot-shaped opening portion provided on an upper portion of a seat back, or may be an elliptical or circular opening portion. In any case, any member can be used so long as the pulling direction of the tensile cloth can be relatively changed.

The passenger restraining device preferably further contains a biasing mechanism embedded inside the seat back portion, which biases the airbag to the passenger side. The biasing mechanism preferably contains: a direction changing part that can move from one end portion of the seat back portion in the left-right direction to a center; and a pretensioner mechanism that pulls the direction changing part toward a center in the left-right direction during expansion and deployment. The tensile cloth preferably reaches the airbag from an end portion of the seat back portion in the left-right direction through the direction changing part, and the pretensioner mechanism preferably pulls the direction changing part during expansion and deployment of the airbag, such that the airbag is biased to the passenger side by the tensile cloth.

With this configuration, the effect of biasing the airbag to the passenger can also be achieved similar to the aforementioned biasing mechanism. Therefore, passenger restraining performance by the airbag can be further increased. Furthermore, with this configuration, even if only one airbag is provided, an effect of biasing the airbag to the passenger can be achieved.

Note that examples of a pretensioner that can be used includes pretensioners with a similar buckle pretensioner structure where a piston is moved in a cylinder by a macro gas generator to rapidly pull a wire or the like. The direction changing part may, for example, have a rod shape such as a shaft or pin, or may be a movable long and thin slot-shaped opening portion provided on an upper portion of a seat back, or an elliptical or circular opening portion. In any case, any member can be used so long as the pulling direction of the tensile cloth can be relatively changed.

The passenger restraining device preferably further contains a biasing mechanism embedded inside the seat back portion, which biases the airbag to the passenger side. The biasing mechanism preferably contains: a first direction changing part that can move from a vicinity of a center portion of the seat back portion to one end portion in the left-right direction; a second direction changing part disposed more on a front side than the first direction changing part at the center of the seat back portion in the left-right direction; and a pushing mechanism that pushes the first direction changing part toward one end portion of the seat back portion on the left or right during expansion and deployment of the airbag. The tensile cloth preferably reaches the airbag from the center of the seat back portion in the left-right direction through the first direction changing part and second direction changing part, and the pushing mechanism preferably pushes the first direction changing part during expansion and deployment of the airbag, such that the airbag is biased to the passenger side by the tensile cloth.

With this configuration, an effect of biasing the airbag to the passenger by the biasing mechanism can be achieved. Therefore, the passenger restraining performance by an airbag can be further increased. Furthermore, with this configuration, even if only one airbag is provided, an effect of biasing the airbag to the passenger can be achieved.

An example of the pushing mechanism can include a pushing mechanism with a similar push-out mechanism that pushes out a piston in a cylinder by a macro gas generator. Furthermore, the first direction changing part and second direction changing part may, for example, have a rod shape such as a shaft or pin, may be a movable long and thin slot-shaped opening portion provided on an upper portion of a seat back, or an elliptical or circular opening portion, or the like, so long as the pulling direction of the tensile cloth can be changed. In any case, any member can be used so long as the pulling direction of the tensile cloth can be relatively changed.

The first tensile cloth and second tensile cloth may be provided so as to merge between the retractor and airbag. Thereby, the first tensile cloth and second tensile cloth can be wound simultaneously around the retractor without entangling.

The tensile cloth includes a first tensile cloth, second tensile cloth, and third tensile cloth. Furthermore, the first tensile cloth deploys to the outside of the seat by expansion and deployment of the airbag, and is stretched from an upper surface of the seat back portion to a region on an opposite side of the first imaginary line of the airbag from passenger to a vehicle front side of the second imaginary line. The second tensile cloth is preferably stretched from an end portion of the first tensile cloth on the airbag downward with a forward inclination to the seat cushion portion. Furthermore, the third tensile cloth is preferably stretched from an end portion of the first tensile cloth on the airbag downward with a rearward inclination to the seat cushion portion. In other words, the tensile cloth is bifurcated in a middle of a path of the airbag. Thereby, the airbag during expansion and deployment can be received in a well balanced manner in the front-rear direction. Therefore, the aforementioned effect can be stably achieved.

The tensile cloth preferably contains: a first tensile cloth; and a second tensile cloth. The first tensile cloth preferably deploys to the outside of the seat by expansion and deployment of the airbag, and is preferably stretched from an upper surface of the seat back portion to a region on an opposite side of the first imaginary line of the airbag from passenger to a vehicle front side of the second imaginary line. The second tensile cloth is preferably a planar member that widens from an end portion of the first tensile cloth on the airbag downward, and is preferably stretched to the seat cushion portion.

The second tensile cloth is a planar member, and therefore, the tensile cloth can catch the airbag during expansion and deployment over a wider area. Therefore, an effect of biasing the airbag to the passenger by the tensile cloth can be enhanced.

Effect of the Invention

An object of the present invention is to provide a passenger restraining device that can more effectively restrict movement of the airbag in an expanded and deployed state in the event of a vehicle collision, and improve the performance of restraining a passenger using an airbag.

REFERENCE NUMERALS

Figure 1:
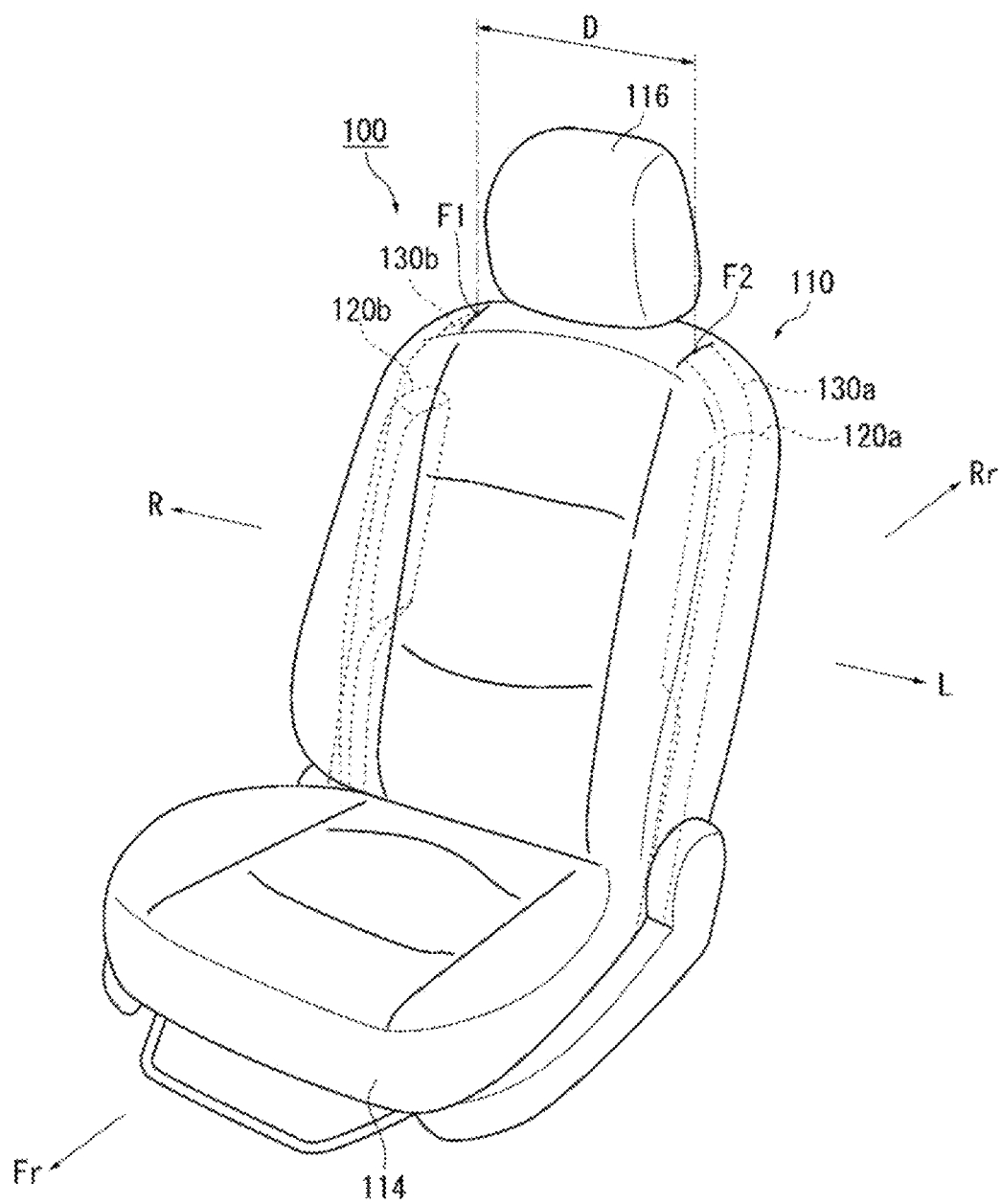
FIG. 1 is a diagram illustrating a passenger restraining device according to embodiment 1.

L1 . . . First imaginary line, F . . . Front-rear length, F1 . . . Center, R1 . . . First region, L2 . . . Second imaginary line, R2 . . . Second region, R3 . . . Third region, R4 . . . 4th region, 100 . . . Passenger restraining device, 100a . . . Passenger restraining device, 110 . . . Seat, 112 . . . Seat back portion, 114 . . . Seat cushion portion, 116 . . . Headrest, 118 . . . Cover, 120a . . . Airbag, 120b . . . Airbag, 130a . . . Left-side tensile cloth, 130b . . . Right-side tensile cloth, 132a . . . First tensile cloth, 132b . . . First tensile cloth, 134a . . . Second tensile cloth, 134b . . . Second tensile cloth, 135a . . . One end, 135b . . . Intermediate portion, 135c . . . Intermediate portion, 200 . . . Passenger restraining device, 230a . . . Left-side tensile cloth, 230b . . . Right-side tensile cloth, 232a . . . 3rd tensile cloth, 232b . . . 3rd tensile cloth, 332 . . . Tensile cloth, 334 . . . Tensile cloth, 336 . . . Tensile cloth, 338 . . . Tensile cloth, 430a . . . Left-side tensile cloth, 530a . . . Left-side tensile cloth, 600 . . . Passenger restraining device, 610 . . . Biasing mechanism, 612 . . . Shaft, 614 . . . Tether, 700 . . . Passenger restraining device, 710 . . . Biasing mechanism, 712 . . . Slide ring, 800 . . . Passenger restraining device, 810 . . . Biasing mechanism, 812 . . . Ring member, 900 . . . Passenger restraining device 910 . . . Biasing mechanism, 912 . . . Retractor, 914 . . . Pin, 1000 . . . Passenger restraining device, 1010 . . . Biasing mechanism, 1012 . . . Shaft, 1014 . . . Pretensioner mechanism, 1100 . . . Passenger restraining device, 1110 . . . Biasing mechanism, 1112 . . . Shaft, 1114 . . . Pin, 1116 . . . Push mechanism, 1202 . . . First tensile cloth, 1204 . . . Second tensile cloth, 1206 . . . Third tensile cloth, 1212 . . . First tensile cloth, 1214 . . . Second tensile cloth, C . . . Center, P . . . Passenger, P1 . . . Shoulder portion

DESCRIPTION OF THE PREFERRED EMBODIMENT

Preferred embodiments according to the present invention will hereinafter be described in detail with reference to the appended drawings. The dimensions, materials, other specific numerical values, etc. indicated in such embodiments are mere exemplifications for ease of understanding of the invention and do not limit the present invention unless otherwise noted. Note that in the present specification and drawings, elements having substantially identical functions and configurations are labeled with identical symbols to omit redundant descriptions along with the illustration of elements not directly related to the present invention.

Note that regarding this embodiment, when a passenger is seated in a seat in a regular posture, the direction the passenger faces is referred to as the front, and the opposite direction is referred to as the rear. Moreover, when the passenger is seated in the seat in a regular posture, the right of the passenger is referred to as the right direction, and the left of the passenger is referred to as the left direction. Furthermore, when the passenger is seated in a regular posture, the direction towards the head of the passenger is referred to as up, and the direction towards the legs of the passenger is referred to as down. In addition, as needed, any diagrams used in descriptions below will indicate the front, rear, left, right, up, and down directions based on the passenger as described above as Fr, Rr, L, R, Up, and Down.

Embodiment 1

FIG. 1 is a diagram illustrating a passenger restraining device 100 according to embodiment 1. For ease of understanding, FIG. 1 illustrates the members stored inside a seat 110 (an airbag 120a and 120b, a left side tensile cloth 130a, and right side tensile cloth 130b as described below) using imaginary lines. In addition, FIG. 1 illustrates the airbags 120a and 120b, the left side tensile cloth 130a, and the right side tensile cloth 130b, when not expanded or deployed.

The passenger restraining device 100 of embodiment 1 is a device to restrain a passenger that is seated in the seat 110.

As illustrated in FIG. 1, the passenger restraining device 100 of embodiment 1 includes the seat 110, airbags 120a and 120b, left side tensile cloth 130a, and right side tensile cloth 130b of the vehicle (full vehicle not shown). The seat 110 includes a seat back portion 112 that supports the upper half of the passenger. A seat cushion portion 114 is provided below the seat back portion 112 on which the passenger sits. A headrest 116 is provided above the seat back portion 114 [sic] that supports the head of the passenger.

As illustrated in FIG. 1, the airbags 120a and 120b (side airbags) are stored in both the left and right sides of the seat back portion 112 of the seat 110. As described below, the airbags 120a and 120b on the left and right sides, as a pair, expand and deploy on the left and right sides of the passenger seated in the seat 110 during a collision and the like of the vehicle.

In this embodiment, the left side tensile cloth 130a and the right side tensile cloth 130b are respectively provided for the pair of airbags 120a and 120b. The left side tensile cloth 130a and the right side tensile cloth 130b are stored in the seat back portion 112 to the seat cushion portion 114 of the seat 110 laterally on the opposite side of the passenger as the pair of stored airbags 120a and 120b.

Figure 2:
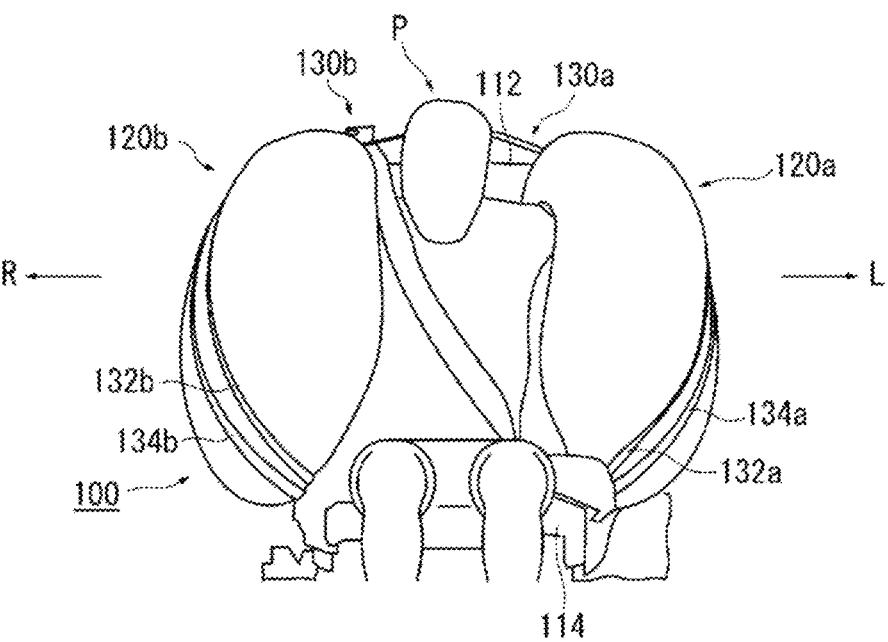
FIG. 2 is a diagram illustrating a passenger in a seated state on a seat in FIG. 1.
Figure 2:
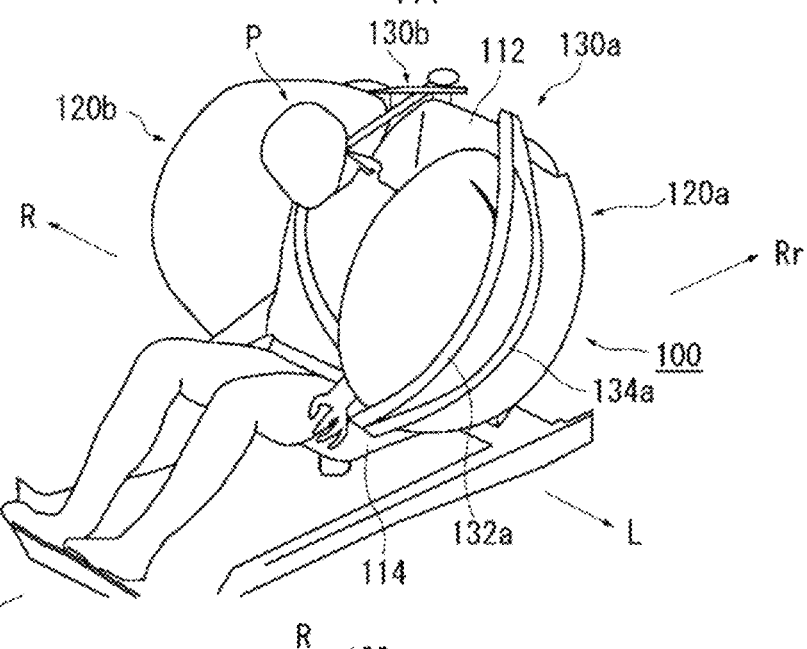
Figure 2:
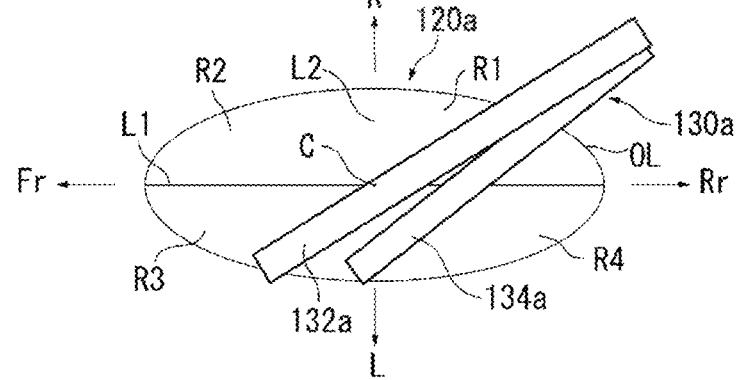

FIG. 2 is a diagram illustrating a passenger P in a seated state on the seat 110 of FIG. 1. FIG. 2 (a) illustrates the seat 110 of FIG. 1 from a front view of the vehicle. FIG. 2 (b) illustrates the seat 110 of FIG. 1 from an oblique forward view of the vehicle. FIG. 2 (c) is a schematic diagram viewing the airbag 120a of FIG. 2 (a) from above.

FIG. 2 (a) through FIG. 2 (c) illustrate the airbags 120a and 120b in an expanded and deployed state, with an AM50 dummy as an example of the passenger P. The positional relationships of the pair of airbags 120a and 120b on the left and right and the corresponding left side tensile cloth 130a and right side tensile cloth 130b are the same for both the left and right. Therefore, the left side airbag 120a and the left side tensile cloth 130a are illustrated and described in FIG. 2 (b) and FIG. 2 (c).

FIG. 2 (c) illustrates the first imaginary line L1 that extends in the longitudinal direction of the vehicle, and the second imaginary line L2 that extends in the left-right direction of the airbag 120a when expanded and deployed. The first imaginary line L1 passes through the center C of the widest portion of the airbag on a straight line parallel to the left and right direction, when viewing a plan view of the airbag when expanded and deployed, and extends in the front and back direction of the vehicle. The second imaginary line L2 intersects the first imaginary line L1 at the center of the first imaginary line L1 in the front and back length of the airbag, and extends in the left and right direction. In this embodiment, as illustrated in FIG. 2 (c), the four regions that are demarcated by the first imaginary line L1 and the second imaginary line L2 are referred to as the first region R1, the second region R2, the third region R3, and the fourth region R4.

As illustrated in FIG. 2 (a) and FIG. 2 (b), in the passenger restraining device 100 of embodiment 1, the left side tensile cloth 130a includes a first tensile cloth 132a and a second tensile cloth 134a. In a similar manner, the right side tensile cloth 130b includes a first tensile cloth 132b and a second tensile cloth 134b. Hereinafter, if there are no distinctions between the first or second tensile cloth on the left or right, they are simply referred to as the right side tensile cloth 130b and the left side tensile cloth 130a.

As illustrated in FIG. 2 (a) and FIG. 2 (b), the airbags 120a and 120b expand and deploy during a vehicle collision or the like. The left side tensile cloth 130a and the right side tensile cloth 130b open the cover of the seat 110 by expansion and deployment of the airbags 120a and 120b, and thereby are deployed out of the seat 110. The deployed left side tensile cloth 130a and right side tensile cloth 130b are pulled across from the proximity of the inside of the shoulder portion of the passenger P in the left and right direction on the upper surface of the seat back portion 112 to the seat cushion portion 114. Therefore, the left side tensile cloth 130a and the right side tensile cloth 130b span diagonally across the airbags 120a and 120b in a direction separating from the passenger P while moving in the forward direction of the vehicle.

As a characteristic of this embodiment, as illustrated in FIG. 2 (c), the deployed first tensile cloth 132a of the left side tensile cloth 130a passes through the third region R3, which of the four regions, is on the opposite side of the first imaginary line L1 as the passenger P and on the forward vehicle side of the second imaginary line L2. Thus, as illustrated in FIG. 2 (a) and FIG. 2 (b), the side surface opposite from the passenger P and the forward side of the airbag 120a that is expanded and deployed are protected by the first tensile cloth 132a. Therefore, movement of the expanded and deployed airbag 120a away from the passenger P and movement in the forward direction can be restricted, thus enabling improvement of the passenger restraining ability of the airbag 120a.

Furthermore, in this embodiment, as illustrated in FIG. 2 (c), the second tensile cloth 134a of the left side tensile cloth 130a provided for the airbag 120a is arranged to intersect with the outline OL of the airbag 120a in the third region R3 when viewing plan view of the expanded and deployed airbag 120a. Thus, the side surface of the airbag 120a on the opposite side as the passenger P in particular can also be reliably maintained. Therefore, movement of the airbag 120a in a direction away from the passenger P can be further restricted.

In addition, the number of holding points of the airbags 120a and 120b is increased by tensile cloths by providing a plurality of tensile cloths, or in other words, two tensile cloths for each of the airbags 120a and 120b as with the passenger restraining device 100 of embodiment 1. Therefore, movement of the expanded and deployed airbags 120a and 120b can be more reliably restricted, enabling an increase in the passenger restraining ability of the airbags 120a and 120b. Note that the number of tensile cloths in embodiment 1 is not limited to the number illustrated. One or more tensile cloths may be provided for each of the airbags 120a and 120b, or a configuration with three or more tensile cloths is also possible.

Furthermore, in the embodiment, as illustrated in FIG. 1, one end of the pair of tensile cloths 130 and 130b that are provided for each of the pair of airbags 120a and 120b is fixed at positions F1 and F2 near the shoulder portion of the passenger P in the seat back portion 112. A space D (see FIG. 1) between the positions F1 and F2 is set to be narrower than the shoulder width of the AM50 dummy. In other words, positions F1 and F2, the installation locations of the tensile cloths 130a and 130b on the surface of the seat back portion 112 are located near the inside of the shoulder portion of the passenger in the left and right directions. Thus, the tensile cloths 130a and 130b are stretched across the outside of the seat 110 with a starting point at positions F1 and F2, as described above, during expansion and deployment of the airbags 120a and 120b.

A force is applied to the pair of airbags 120a and 120b in a direction that presses toward the side of the passenger P near the shoulder portion of the passenger P by the tensile cloths 130a and 130b that are stretched from starting point positions F1 and F2 with an interval D narrower than the shoulder width of the AM dummy 50. Therefore, movement of the airbags 120a and 120b away from the passenger P can be more effectively restricted. Therefore, the airbags 120a and 120b are able to more effectively restrain the passenger P, improving the passenger restraining ability of the passenger restraining device 100.

Figure 3:
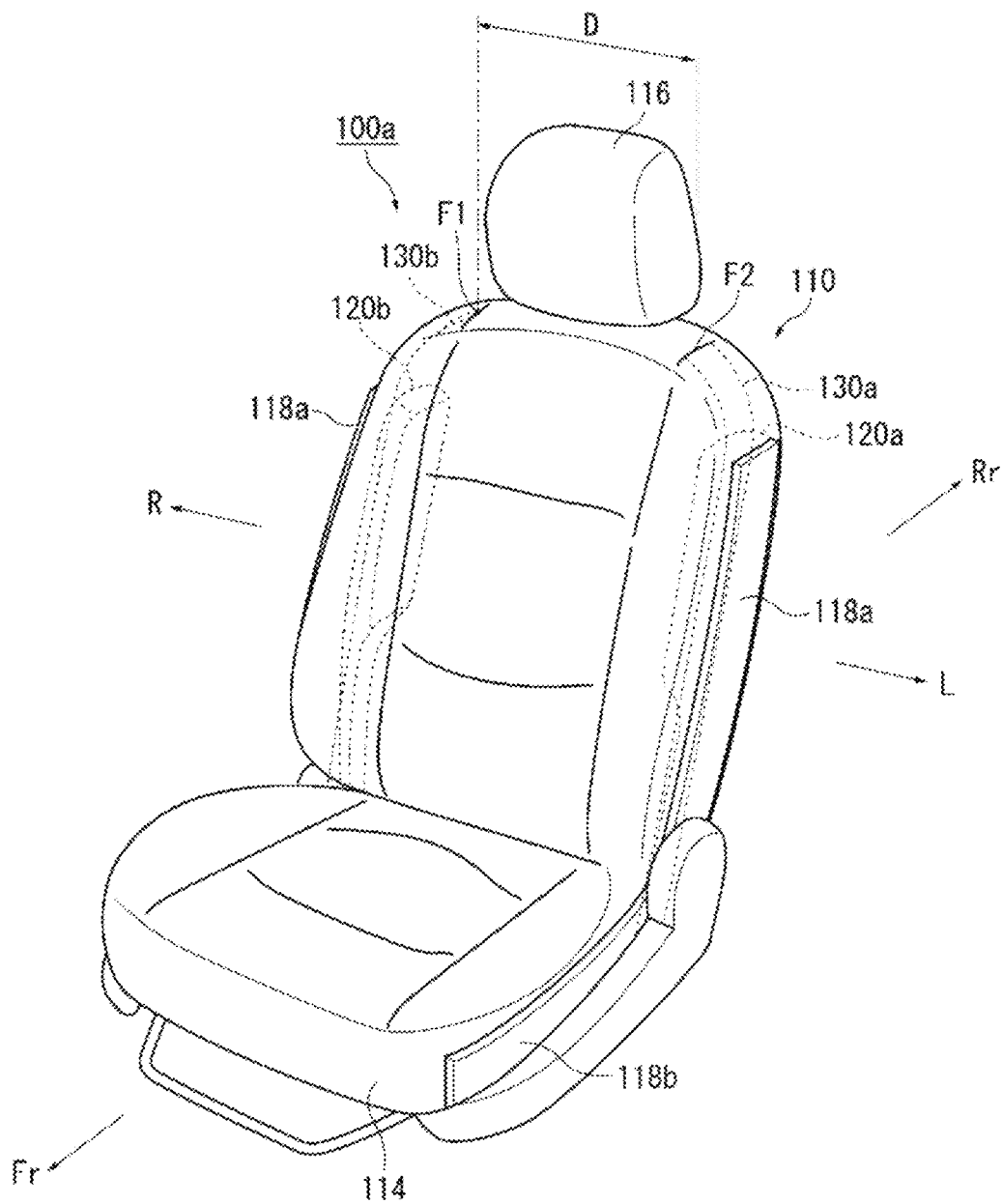
FIG. 3 is a diagram describing another example of the passenger restraining device in the embodiment 1.

FIG. 3 is a diagram describing another example of the passenger restraining device of embodiment 1. The passenger restraining device 100 illustrated in FIG. 3 includes cases 118a and 118b arranged on the side of the seat 110. Case 118a is a case that houses the airbags 120a and 120b. Case 118b is a case that stores the tensile cloths 130a and 130b. With the passenger restraining device 100 illustrated in FIG. 3, the tensile cloths 130a and 130b are deployed from the case 118b to the side of the seat 110 during expansion and deployment of the airbags 120a and 120b. This configuration will also provide the same effects as the passenger restraining device described above.

Embodiment 2

Figure 4:
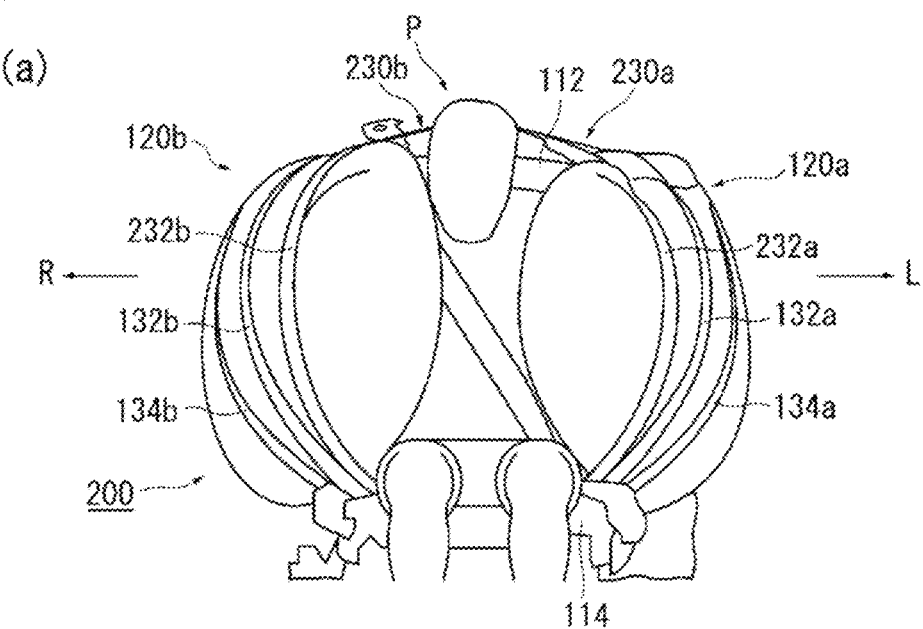
FIG. 4 is a diagram illustrating a passenger restraining device according to embodiment 2.
Figure 4:
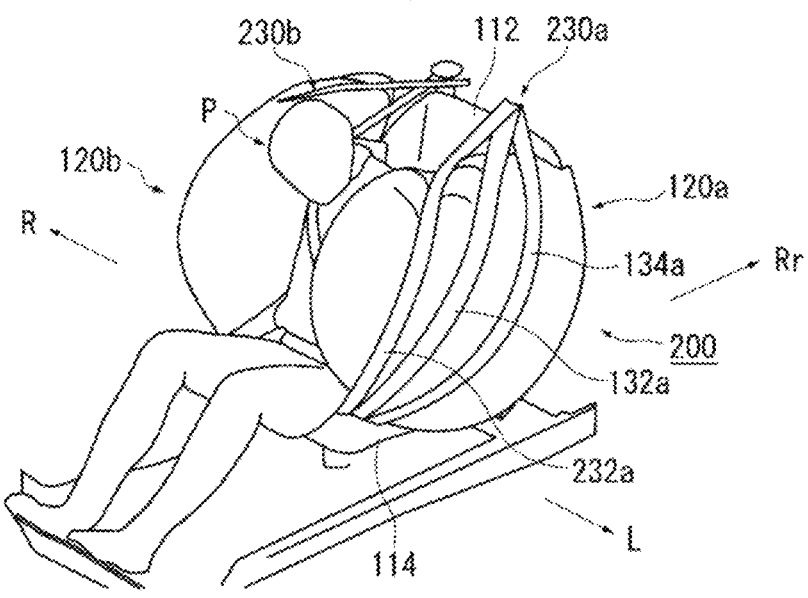
Figure 4:
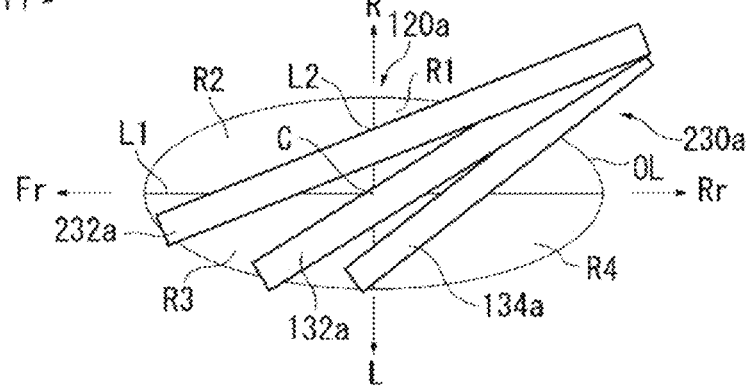

FIG. 4 is a diagram illustrating a passenger restraining device 200 according to embodiment 2. FIG. 4 (a) illustrates the seat 110 of FIG. 1 from a front view of the vehicle. FIG. 4 (b) illustrates the seat 110 of FIG. 1 from an oblique forward view of the vehicle. FIG. 4 (c) is a schematic diagram viewing the airbag 120a of FIG. 4 (a) from above.

The occupant restraining device 200 illustrated in FIG. 4 only differs from the occupant restraining device 100 in the configuration of the left side tensile cloth and the right side tensile cloth. Therefore, components other than the left side tensile cloth and the right side tensile cloth have the same symbols, and descriptions thereof are omitted.

As illustrated in FIG. 4 (a) and FIG. 4 (b), for the passenger restraining device 200 of embodiment 2, the left side tensile cloth 230a includes a first tensile cloth 132a and a second tensile cloth 134a, as well as a third tensile cloth 232a. In a similar manner, the right side tensile cloth 230b includes a first tensile cloth 132b and a second tensile cloth 134b, as well as a third tensile cloth 232b.

As illustrated in FIG. 4 (c), the third tensile cloth 232a passes through the third region R3 at a position closer to the passenger than the first tensile cloth 132a. By increasing the number of tensile cloths that pass through the third region R3 in this manner, movement of the airbag 120a can be more suitably restricted. Therefore, this enables a further increase in the passenger restraining ability of the airbag 120a.

Tensile Cloth Variations

Figure 5:
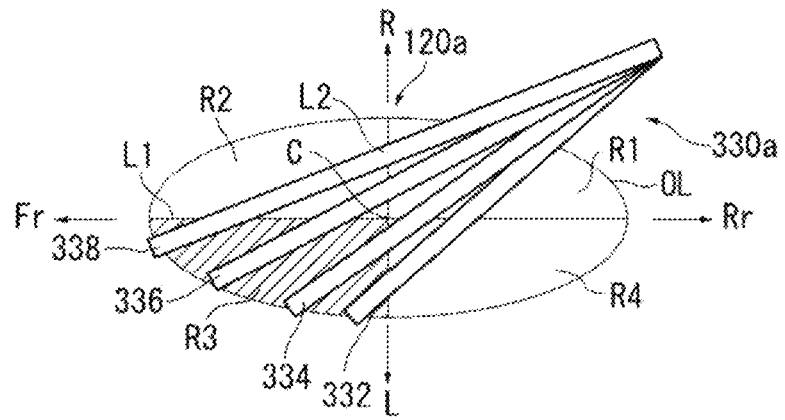
FIG. 5 is a diagram illustrating tensile cloth variations applicable to embodiment 1 in FIG. 1 and embodiment 2 in FIG. 2.
Figure 5:
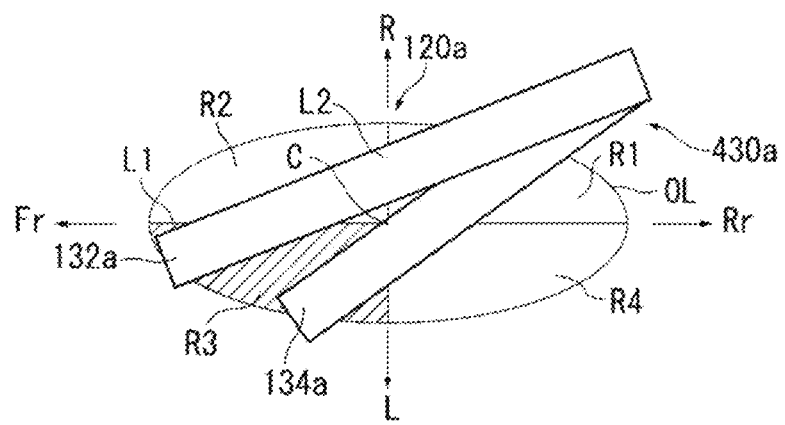
Figure 5:
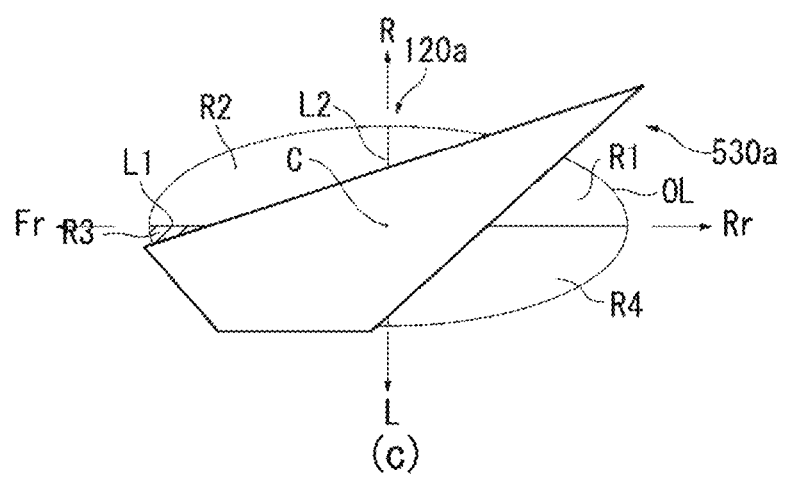

FIG. 5 is a diagram illustrating tensile cloth variations applicable to embodiment 1 of FIG. 1 and embodiment 2 of FIG. 2. FIG. 5 illustrates a left side tensile cloth provided for the left side of the airbag 120a. The left side tensile cloth 330a illustrated in FIG. 5 (a) includes four tensile cloths 332, 334, 336, and 338 that passes through the third region R3. Thereby a further increase in the effect of restricting movement of the airbag 120a is possible. The left side tensile cloth 430a illustrated in FIG. 5 (b) is arranged such that both the first tensile cloth 132a and the second tensile cloth 134a pass through the third region R3 of the airbag 120a. This arrangement also enables obtaining the same effect as described above.

In FIG. 5 (c), one left side tensile cloth 530a is provided for the airbag 120a. The left side tensile cloth 530a has a shape such that the width thereof becomes wider from the seat back portion 112 towards the seat cushion portion 114 (see FIG. 1). Thereby, even if there is one tensile cloth, the airbag 120a can be held across a wide surface area. Consequently, the tensile cloth provides a sufficient effect of retaining the airbag 120a. Therefore, movement of the airbag 120a can be more reliably restricted during expansion and deployment, enabling an improvement in the passenger restraining ability of the airbag 120a.

Airbag Variations

Figure 6:
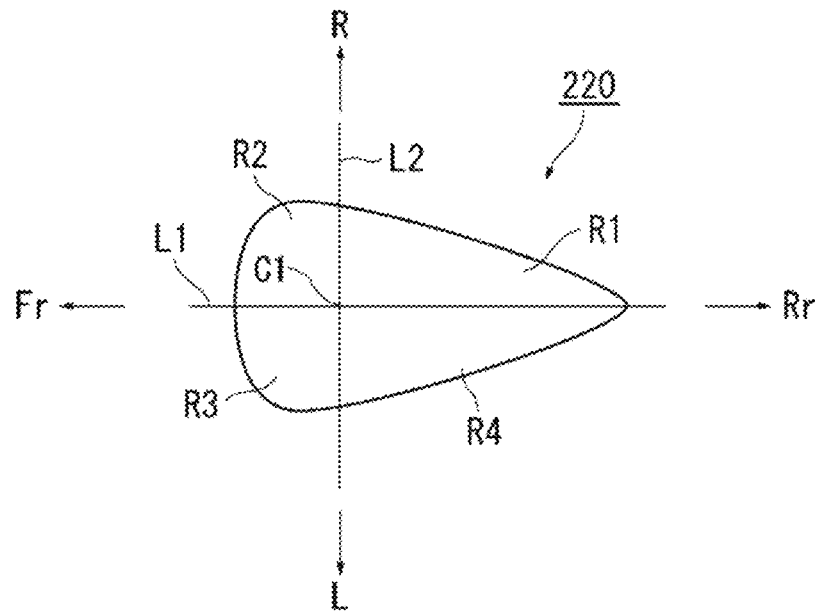
FIG. 6 is a diagram illustrating variations of an airbag.
Figure 6:
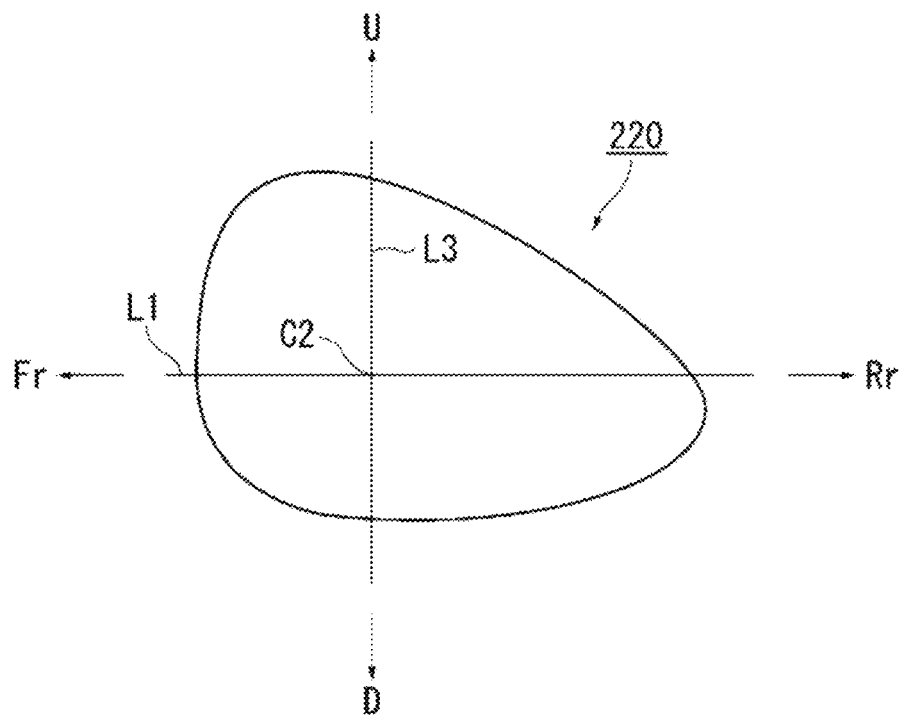

FIG. 6 is a diagram illustrating variations of the airbag. FIG. 6 (a) is a diagram illustrating a planar view of an airbag 220 from above, and FIG. 6 (b) is a diagram illustrating a side view of the airbag 220. The present invention, as described above, can also be applied to a passenger restraining device containing an airbag 220 that does not have an elliptic shape from a planar view above when expanded and deployed, as illustrated in FIGS. 6 (a) and (b).

As illustrated in FIG. 6 (a), when viewing the airbag 220 during expansion and deployment above in a planar view, the first imaginary line L1 extends in the longitudinal direction of the vehicle and extends through a centroid C1 that is the center of gravity of the planar figure. The second imaginary line L2 extends in the left-right direction orthogonal to the first imaginary line L1 at the centroid C1. Furthermore, the first region R1, the second region R2, the third region R3, and the fourth region R4 are divided by the first imaginary line L1 and the second imaginary line L2.

Of these four regions, the third region R3 is on the opposite side of the first imaginary line L1 as the passenger P, and toward the front side of the vehicle from the second imaginary line L2. The same effects as described above can be obtained with tensile cloths (see FIG. 1 to FIG. 5) passing through the third region R3. Therefore, the same effects as the passenger restraining device 100 in embodiment 1 can be obtained even for a passenger restraining device containing an airbag 220 that does not have an elliptic shape, as viewed from a plan view during expansion and deployment.

Note that the side view is preferably considered when applying the present invention to an airbag 220 that does not have an elliptic shape when viewed from a plan view above during expansion and deployment, and that does not have longitudinal symmetry when viewed from the side. Specifically, if the shape of the airbag 220 when viewed from the side is longitudinally asymmetric as illustrated in FIG. 6 (b), a centroid C2 which is the center of gravity of the plane figure when viewed from the side is determined.

Next, of the first imaginary line L1 and a third imaginary line L3 that goes through the centroid C2, use the left-right cross-section at the position of the first imaginary line L1 as the plane figure the calculate the centroid thereof. Thereby, the centroid of the airbag 220 viewed from a plan view can be calculated by considering the shape of the airbag 220 when viewed from the side. Therefore, the centroid of the airbag 220 as viewed from the plan view can be determined with greater accuracy.

Embodiment 3

Figure 7:
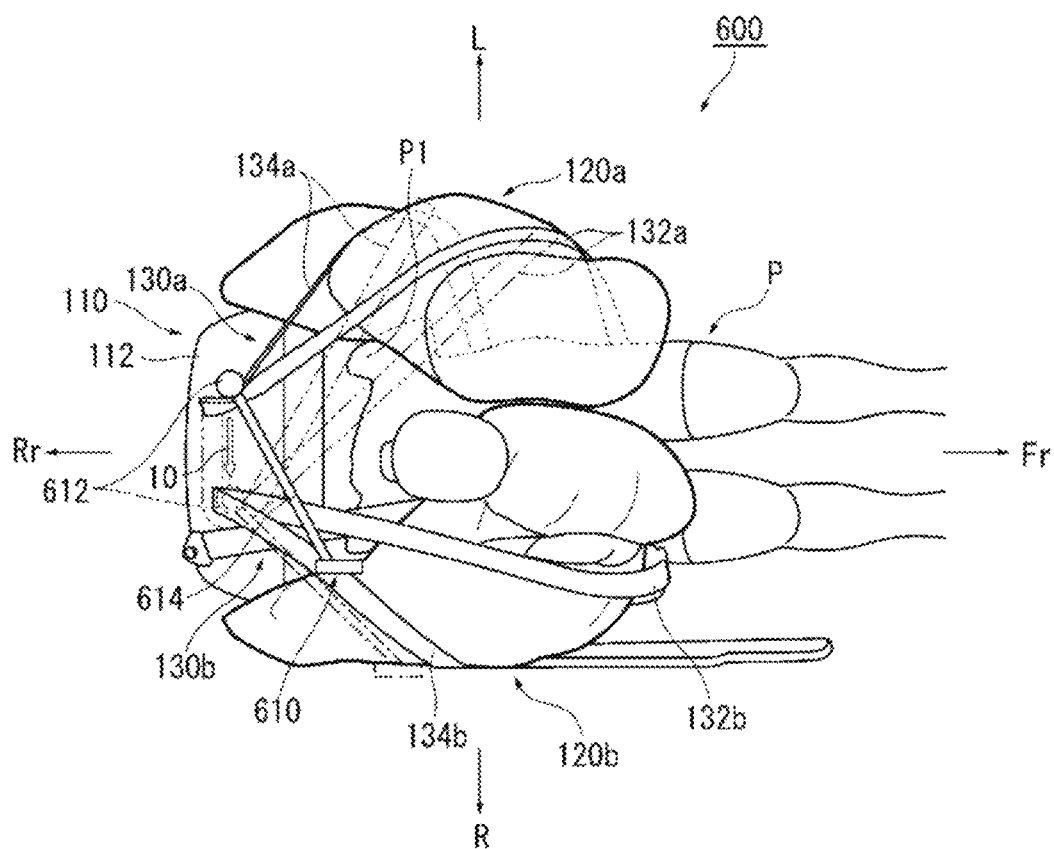
FIG. 7 is a diagram illustrating a passenger restraining device according to embodiment 3.

FIG. 7 is a diagram illustrating a passenger restraining device 600 according to embodiment 3. FIG. 7 illustrates the seat 110 as viewed from a plan view after expansion and deployment of the airbags 120a and 120b in order to simplify understanding. Note that all components of the following embodiment that are common to those that have been described in the above embodiments are given the same symbols, and descriptions thereof are omitted. In addition, the following diagrams used for describing the embodiment indicate the positions of members before movement using solid lines, and indicate positions of members after movement using dashed lines.

As illustrated in FIG. 7, the passenger restraining device 600 of embodiment 3 includes the airbags 120a and 120b as described above, and tensile cloths (left side tensile cloth 130a and right side tensile cloth 130b). In the present embodiment, the left side tensile cloth 130a is provided with the first tensile cloth 132a and the second tensile cloth 134a, and the right side tensile cloth 130b is also provided with the first tensile cloth 132b and the second tensile cloth 134b.

Of the tensile cloths described above, the left side tensile cloth 130a is fixed to the seat back portion 112 in the left-right direction at a position on the interior of a shaft 612 as described below. Note that in the present embodiment, both the left side tensile cloth 130a and the right side tensile cloth 130b are provided with two tensile cloths, however, there is no limitation to this. The number of tensile cloths for the left side tensile cloth 130a and the right side tensile cloth 130b can be changed as appropriate.

The passenger restraining device 600 of embodiment 3 includes the airbags 120a and 120b, tensile cloths (left side tensile cloth 130a and right side tensile cloth 130b), and in addition, further includes a biasing mechanism 610 that biases the airbag 120a (one airbag) to the passenger P side. The biasing mechanism 610 includes the shaft 612 and a tether 614.

The shaft 612 is arranged in a position corresponding to a shoulder portion P1 of the passenger P on the side with one airbag (left side airbag 120a in the present embodiment) of the seat back portion 112, and can slide in the left-right direction of the seat back portion 112. The tether 614 is connected to the opposite side as the side with one airbag (right side airbag 120b) and the shaft 612. These members are embedded inside the seat back portion 112 before expansion and deployment of the airbags 120a and 120b.

In a similar manner to the passenger restraining device 100 in embodiment 1, with the passenger restraining device 600 in embodiment 3, when the airbags 120a and 120b expand and deploy as illustrated in FIG. 7, the tensile cloths (left side tensile cloth 130a and right side tensile cloth 130b) deploy out of the seat 110 due to the covering of the seat 110 opening. Therefore, the tensile cloths are stretched from near the interior of the shoulder portion P1 of the passenger P in the left-right direction on the upper surface of the seat back portion 112 to the seat cushion portion 114 (see FIG. 1).

At this time, the tether 614 is deployed out of the seat 110 through a break in the covering of the seat 110. Furthermore, the shaft 612 moves the seat back portion 112 in the direction of the arrow 10 to a position corresponding to the other shoulder portion of the passenger P, or in other words, to the position illustrated by the dashed line circle, by pulling on the tether 614 (illustrated by the two dot dashed line) by the opposite side airbag which is the airbag 120b. Thereby, of the tensile cloths, the left side tensile cloth 130a is placed in a state of tension by the shaft 612 as illustrated by the two dot dashed line, and the airbag 120a is biased towards the passenger P. Note that the shaft 612 can also be configured to lock after movement. Thereby, the tensile cloth tension will not easily change when restraining the passenger, thus improving stability when restraining.

With the configuration as described above, the biasing mechanism 610 will cause the side with one airbag, the left side airbag 120a, to bias towards the passenger during expansion and deployment of the airbags 120a and 120b. Thereby, the tensile cloths more effectively suppress movement of the airbags 120a and 120b in the left-right direction, enabling further improvement of the passenger restraining ability of the airbags 120a and 120b.

Note that the present embodiment illustrates a configuration that provides a biasing mechanism 610 on the left side airbag 120a, but this is not a limitation. The biasing mechanism 610 can be provided for the right side airbag 120b, or can be provided for the pair of airbags 120a and 120b.

Embodiment 4

Figure 8:
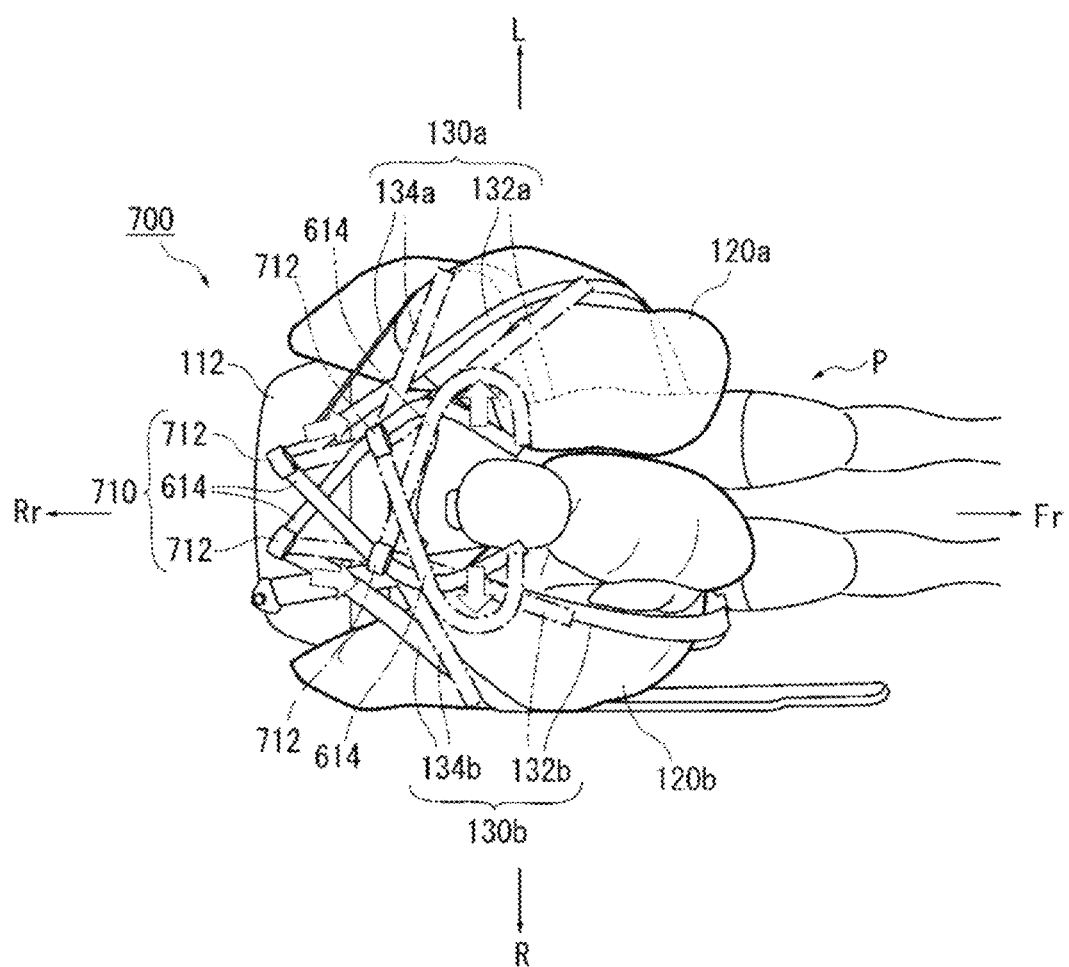
FIG. 8 is a diagram illustrating a passenger restraining device according to embodiment 4.

FIG. 8 is a diagram illustrating a passenger restraining device 700 according to embodiment 4. FIG. 8 illustrates the seat 110 viewed from above after expansion and deployment of the airbags 120a and 120b. As illustrated in FIG. 8 (b), for the passenger restraining device 700 in embodiment 4, the pair of airbags 120a and 120b each include a biasing mechanism 710 provided with a slide ring 712 and a tether 614.

The slide ring 712 is a ring shaped member through which the tensile cloths pass. The slide ring 712 is provided in a position on the seat back portion 112 corresponding to the shoulder portion of the passenger P on the side with one airbag. More specifically, the left side tensile cloth 130a passes through the left side slide ring 712, and the right side tensile cloth 130b passes through the right side slide ring 712. Thereby, the slide ring 712 is able to move forward along the tensile cloths (left side tensile cloth 130a and right side tensile cloth 130b). After passing through the slide ring 712, the tensile cloth is fixed to the seat back portion 112.

The tether 614 is connected to an airbag and the slide ring 712 on the opposite side as the side with one airbag. In other words, for the biasing mechanism 710 provided for the left side airbag 120a, the tether 614 connected to the left side slide ring 712 is connected to the right side airbag 120b. On the other hand, for the biasing mechanism 710 provided for the right side airbag 120b, the tether 614 connected to the right side slide ring 712 is connected to the left side airbag.

In embodiment 4 as well, when the airbags 120a and 120b expand and deploy, the tensile cloths (left side tensile cloth 130a and right side tensile cloth 130b) deploy out of the seat 110 and are stretched across the seat back portion 112 and the seat cushion portion (see FIG. 1). At this time, the tether 614 and the slide ring 712 are exposed to the outside from the seat 110 due to breaking of the covering of the seat 110.

Furthermore, the tether 614 is pulled by the airbag on the opposite side, the slide ring 712 moves forward, and the slide ring 712 is separated from the position where the tensile cloth is fixed to the seat back portion 112. Thereby, the tensile cloths are pulled, and one of the airbags is biased towards the passenger P.

More specifically, for the left side biasing mechanism 710, the tether 614 connected to the left side slide ring 712 is pulled by the right side airbag 120b. Thereby, the left side slide ring 712 moves forward, and the left side tensile cloth 130a is pulled. Therefore, the left side airbag 120a is pulled by the left side tensile cloth 130a, and the left side airbag 120a is biased toward the passenger.

Any configuration using a slide ring 712 in place of the shaft 612 as the biasing mechanism 710 in embodiment 4, as described above, will provide the same effect of biasing one airbag toward the passenger P. Therefore, the passenger restraining ability of the airbags 120a and 120b can be further increased.

In addition, in embodiment 4, the left side tensile cloth 130a, right side tensile cloth 130b, and the biasing mechanism 710 were provided for both of the pair of airbags 120a and 120b. Thereby, the effects of the biasing mechanism 710 can be obtained for both of the pair of airbags 120*a* and 120*b*. Therefore, further improvement of passenger restraining ability is possible. However, this is not a limitation, and a configuration that provides the biasing mechanism 710 in embodiment 4 to one of the pair of airbags 120*a* and 120*b* is also possible.

Furthermore, for the biasing mechanism 710 in embodiment 4, the tether 614 is connected to the surface of the airbags 120*a* and 120*b* in contact with the passenger P. Thereby, the length of the tether 614 can be shortened. In addition, in embodiment 4, the biasing mechanism 710 is provided for each of the pair of airbags 120*a* and 120*b*, where the tether 614 is connected to the surface of the airbags 120*a* and 120*b* on the side that is in contact with the passenger P. Thereby, as illustrated in FIG. 8, the upper half of the passenger P and the shoulder portion in particular, are placed in an enclosed state due to the two intersecting tethers 614.

With the configuration described above, the biasing force of the airbags 120*a* and 120*b* will be increased for a passenger P with a large build, for example, by the tethers 614 and the tensile cloths (left side tensile cloth 130*a* and right side tensile cloth 130*b*). On the other hand, the biasing force of the airbags 120*a* and 120*b* will be reduced for a passenger P with a small build by the tethers 614 and the tensile cloths (left side tensile cloth 130*a* and right side tensile cloth 130*b*). Therefore, the biasing force (restraining force) can be adjusted to match the physique of the passenger P.

Embodiment 5

Figure 9:
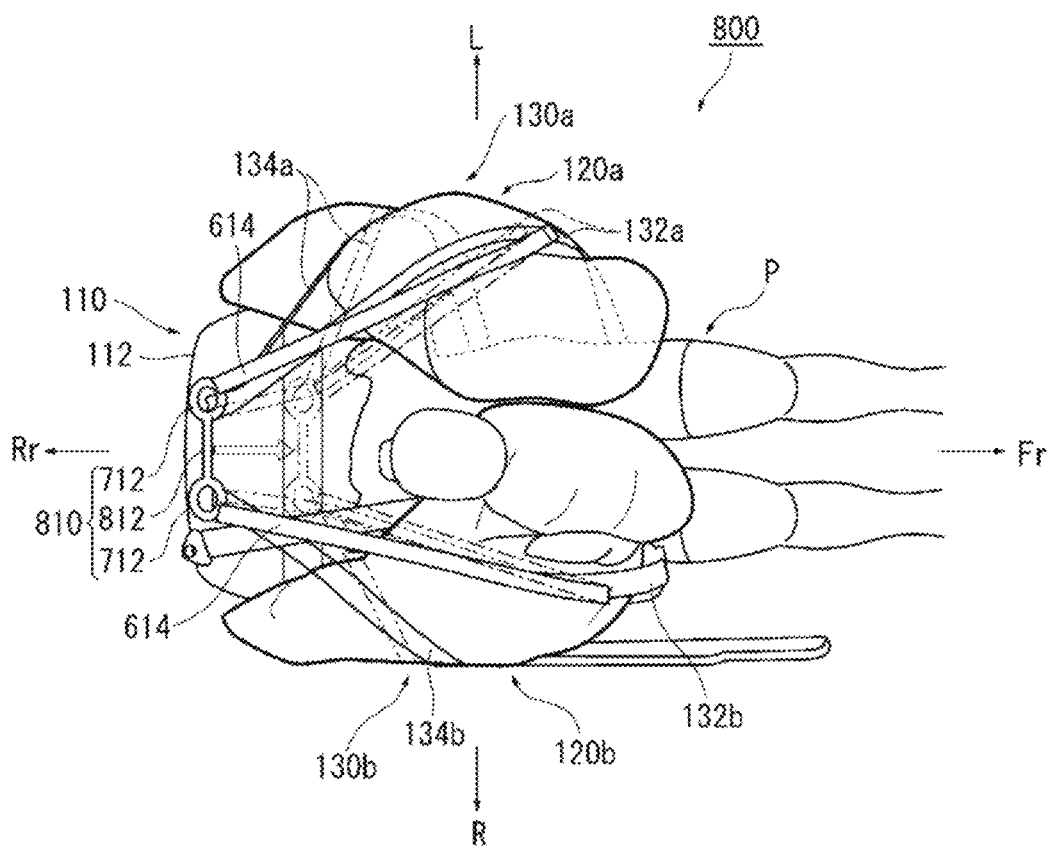
FIG. 9 is a diagram illustrating a passenger restraining device according to embodiment 5.

FIG. 9 is a diagram illustrating a passenger restraining device 800 according to embodiment 5. FIG. 9 also illustrates the seat 110 viewed from above after expansion and deployment of the airbags 120*a* and 120*b*. As illustrated in FIG. 9, the passenger restraining device 800 includes a biasing mechanism 810 that is provided with the slide ring 712, tether 614, and ring portion 812.

A characteristic of the biasing mechanism 810 of embodiment 5 is that the slide rings 712 that are provided on both of the biasing mechanisms 810 are joined by the ring portion 812. With the biasing mechanism 810 of embodiment 5 as well, when the airbags 120*a* and 120*b* expand and deploy, the tensile cloths (left side tensile cloth 130*a* and right side tensile cloth 130*b*) deploy out of the seat 110 and are stretched across the seat back portion 112 and the seat cushion portion (see FIG. 1).

Furthermore, the two slide rings 712 that are joined by the tether 614 and the ring portion 812 are exposed out of the seat 110 through the break in the covering of the seat 110. Therefore, the tether 614 is pulled by the airbags 120*a* and 120*b*, the slide ring 712 moves forward, and the slide ring 712 is separated from the position where the tensile cloths (left side tensile cloth 130*a* and right side tensile cloth 130*b*) are fixed to the seat back portion 112. Thereby, the tensile cloths are pulled, and the airbags 120*a* and 120*b* are biased towards the passenger P. At this time, the two slide rings 712 that are joined by the ring portions 812 enable moving the biasing mechanisms 810 provided for each of the pair of airbags 120*a* and 120*b*.

Embodiment 6

Figure 10:
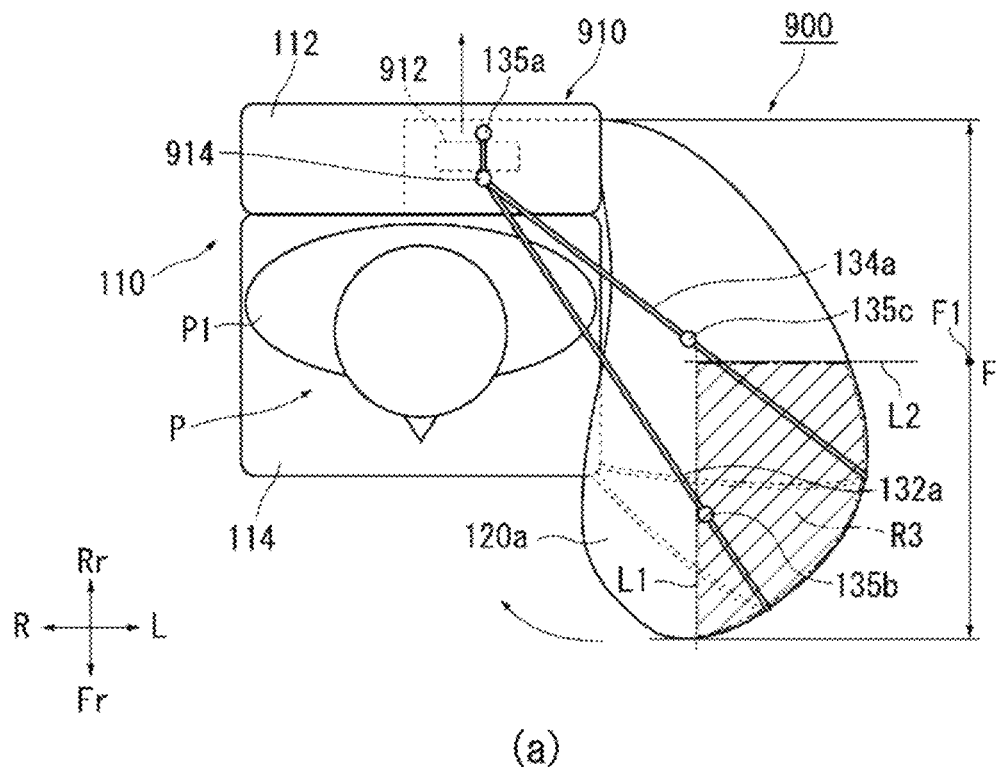
FIG. 10 is a diagram illustrating a passenger restraining device according to embodiment 6.
Figure 10:
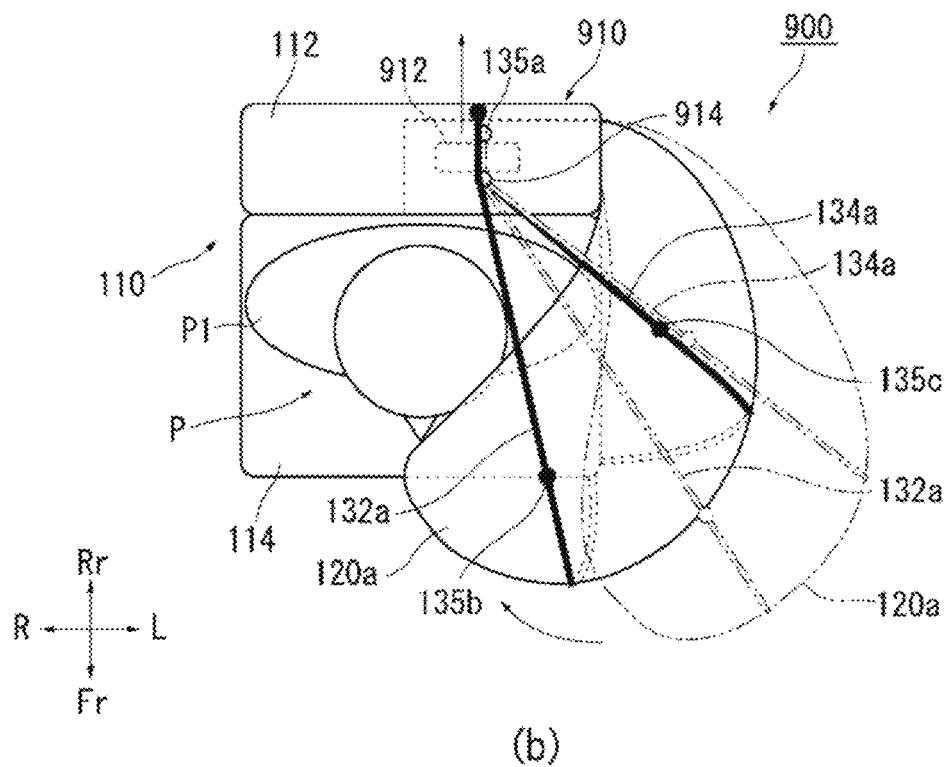

FIG. 10 is a diagram illustrating a passenger restraining device 900 according to embodiment 6, and illustrates the seat 110 in a state as viewed from above. Note that for embodiment 6 and onward, the movement of the left side airbag 120*a*, of the airbags 120*a* and 120*b* as described above, will be described as an example. However, this does not mean that the biasing mechanism, described below, is only provided for the left side airbag 120*a*, and one side of the biasing mechanism can be provided for the airbag 120*b* on the other side, or can be provided for both sides airbags 120*a* and 120*b* thereof.

As illustrated in FIG. 10 (*a*), the passenger restraining device 900 in embodiment 6 is provided with a biasing mechanism 910 that biases the airbag 120*a* towards the passenger side. The biasing mechanism 910 is configured to include a retractor 912. The retractor 912 is embedded inside the seat back portion 112, and is connected to the end portion 135*a* of the first tensile cloth 132*a* and the seat back portion 112.

As illustrated in FIG. 10 (*a*), the airbag 120*a* is deployed at a position slightly separated from the passenger P in the initial stage of expansion and deployment by the airbag 120*a*. The retractor 912 operates instantly at the same time or immediately after deployment, and the first tensile cloth 132*a* and the second tensile cloth 134*a* are wound up by the retractor 912. Thereby, the first tensile cloth 132*a* and the second tensile cloth 134*a* are shortened by the amount wound up by the retractor 912. As a result, as illustrated in FIG. 10 (*b*), the airbag 120*a* is biased towards the passenger side, and the passenger P is reliably restrained by the airbag 120*a*.

With the biasing mechanism 910 in embodiment 6, the same effect of biasing the airbag 120*a* towards the passenger P is obtained as with the biasing mechanisms in the embodiments described above, enabling a further increase in the passenger restraining ability of the airbag 120*a*. In particular, the biasing mechanism 910 in embodiment 6 is not shared between the pair of airbags 120*a* and 120*b*, and can provide an effect of biasing the airbag 120*a* towards the passenger P with just one airbag 120*a*.

In addition, as illustrated in FIG. 10 (*a*), the end portions 135*a* of the first tensile cloth 132*a* and the second tensile cloth 134*a* are pulled into the seat back portion 112 at a position further to the inside than the shoulder P1 of the passenger P, and are connected to the retractor 912 inside the seat back portion 112. Note that this retractor 912 has a similar configuration as a seat belt retractor used to wind up seat belts, and is not described in detail for the present invention. Thereby, the force of biasing the airbag 120*a* towards the passenger P by the first tensile cloth 132*a* and the second tensile cloth 134*a* can be increased.

Furthermore, as illustrated in FIG. 10 (*a*), of the first tensile cloth 132*a* and the second tensile cloth 134*a*, the first tensile cloth 132*a* is connected to the airbag 120*a* farther forward than a center F1 along a longitudinal length F in a middle portion 135*b* when viewing the expanded and deployed airbag 120*a* in a plan view from above, and the seat cushion portion 114 thereof is connected through this point. Thereby, the first tensile cloth 132*a* passes through the region R3, which is on the opposite side of the first imaginary line L1 above the airbag 120*a*, and on the forward side of the vehicle of the second imaginary line L2.

The second tensile cloth 134*a* is connected to the seat cushion portion 114 via a connection to the airbag 120*a* at a middle portion 135*c*, which is further to the rear than the middle portion 135*b* of the first tensile cloth 132*a*. The center portion 135*c* of the second tensile cloth 134*a* is connected to the center portion 135*b* of the first tensile cloth 132*a*, of the front and rear portions of the airbag 120*a*, respectively, in this manner, and thereby the airbag 120*a* can be received with good balance in the front-back direction during expansion and deployment, and the effects described above can be obtained in a stable manner. Note that if the first tensile cloth 132a and the second tensile cloth 134a can be provided at a predetermined position on the airbag 120a, the middle portions 135b and 135c do not necessarily need to be connected to the airbag 120a.

In addition, as illustrated in FIG. 10 (a), the biasing mechanism 910 in embodiment 6 includes a pin 914 (direction changing portion) which collects the first tensile cloth 132a and the second tensile cloth 134a from the retractor 912 to the airbag 120a, or in other words, supports integrating the tensile cloths. Furthermore, the first tensile cloth 132a and the second tensile cloth 134a are wound up by the retractor 912 at the pin 914 during expansion and deployment of the airbag 120a. Thereby, for a configuration with two tensile cloths, the retractor winds up the two tensile cloths (first tensile cloth 132a and second tensile cloth 134a) at the same time, without the tensile cloths becoming entwined.

Note that the first tensile cloth 132a and the second tensile cloth 134a can also merge at the pin 914 and be wound up by the retractor 912. In addition, while the present embodiment illustrates an airbag and tensile cloth on one side of the seat 110, the same device can be arranged on both the left and right sides of the seat 110 (for a passenger seated normally).

Embodiment 7

Figure 11:
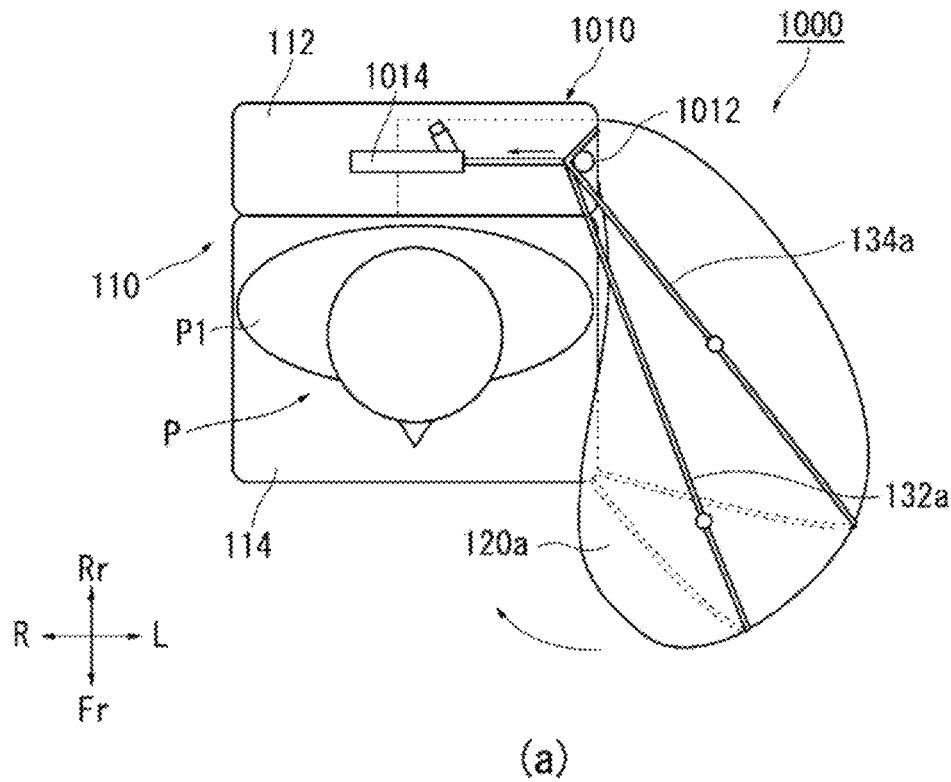
FIG. 11 is a diagram illustrating a passenger restraining device according to embodiment 7.
Figure 11:
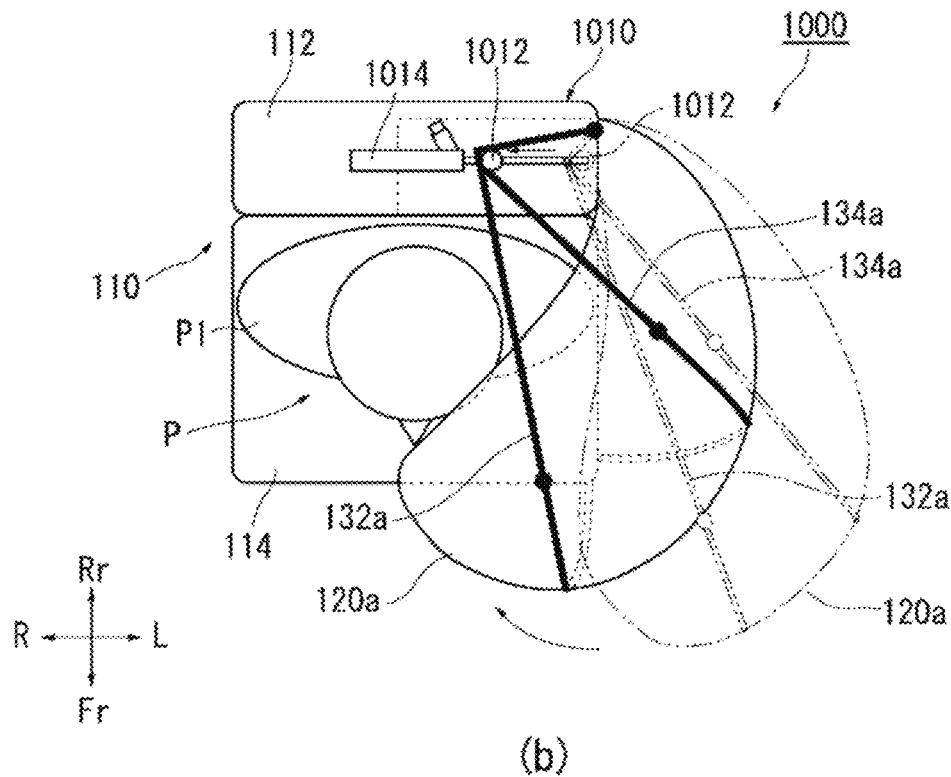

FIG. 11 is a diagram illustrating a passenger restraining device 1000 according to embodiment 7, and illustrates the seat 110 in a state as viewed from above. As illustrated in FIG. 11 (a), the passenger restraining device 1000 in embodiment 7 is provided with a biasing mechanism 1010 that biases the airbag 120a towards the passenger side. The tensile cloths are the same as in embodiment 6, and the descriptions thereof are omitted.

The biasing mechanism 1010 is configured to include a shaft 1012 and a pretensioner mechanism 1014. The shaft 1012 is provided so as to be moveable from an end portion of the left side and to the center of the seat back portion 112. The pretensioner 1014 is pulled towards the center in the left-right direction of the shaft 1012 during expansion and deployment of the airbag 120a. The first tensile cloth 132a and the second tensile cloth 134a reach the airbag 120a from the left side of the seat back portion through the shaft. Note that the pretensioner mechanism 1014 has a configuration similar to the buckle pretensioner used to wind up the buckle of the seat belt, and no description thereof is provided for the present invention.

As illustrated in FIG. 11 (a), the airbag 120a is deployed at a position slightly separated from the passenger P in the initial stage of airbag 120a expansion and deployment. The pretensioner mechanism 1014 operates instantly at the same time or immediately following deployment, and the pretensioner mechanism 1014 pulls on the shaft 1012 (direction changing portion). Thereby, the shaft 1012 is pulled to the center of the seat back portion 112, and the first tensile cloth 132a and the seat back portion 112 are pulled to the center of the seat back portion 112. As a result, as illustrated in FIG. 11 (b), the airbag 120a is biased towards the passenger side by the first tensile cloth 132a and the second tensile cloth 134a, and the passenger P is reliably restrained by the airbag 120a.

With the biasing mechanism 1010 in embodiment 7, the same effect of biasing the airbag 120a towards the passenger P is obtained by the biasing mechanism in the embodiments as described above, enabling a further increase in the passenger restraining ability of the airbag 120a. In addition, with the biasing mechanism 1010 in embodiment 7, the effect of biasing the airbag 120a towards the passenger P can be obtained with one airbag 120a alone, in the same manner as the biasing mechanism 910 in embodiment 6.

Note that embodiment 7 illustrates a configuration where the shaft 1012 is provided on the end portion of the left side of the seat back portion 112. This is due to the airbag 120a being provided on the left side of the passenger P, and the configuration shall be such that the shaft 1012 is provided on the end portion of the right side for the airbag 120b that is provided on the right side of the passenger P (see FIG. 1). In addition, for the airbag 120b that is provided on the right side of the passenger P, the tensile cloths (first tensile cloth 132a and second tensile cloth 134a) are configured to reach the airbag 120b from the right side of the seat back portion 112 via the shaft 1012.

Embodiment 8

Figure 12:
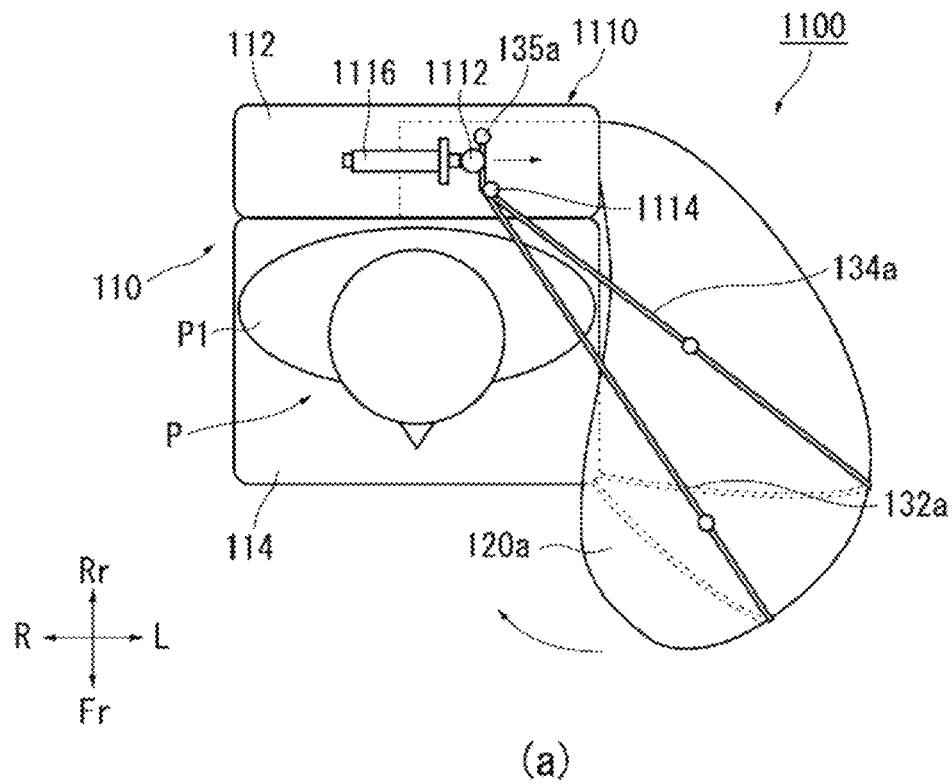
FIG. 12 is a diagram illustrating a passenger restraining device according to embodiment 8.
Figure 12:
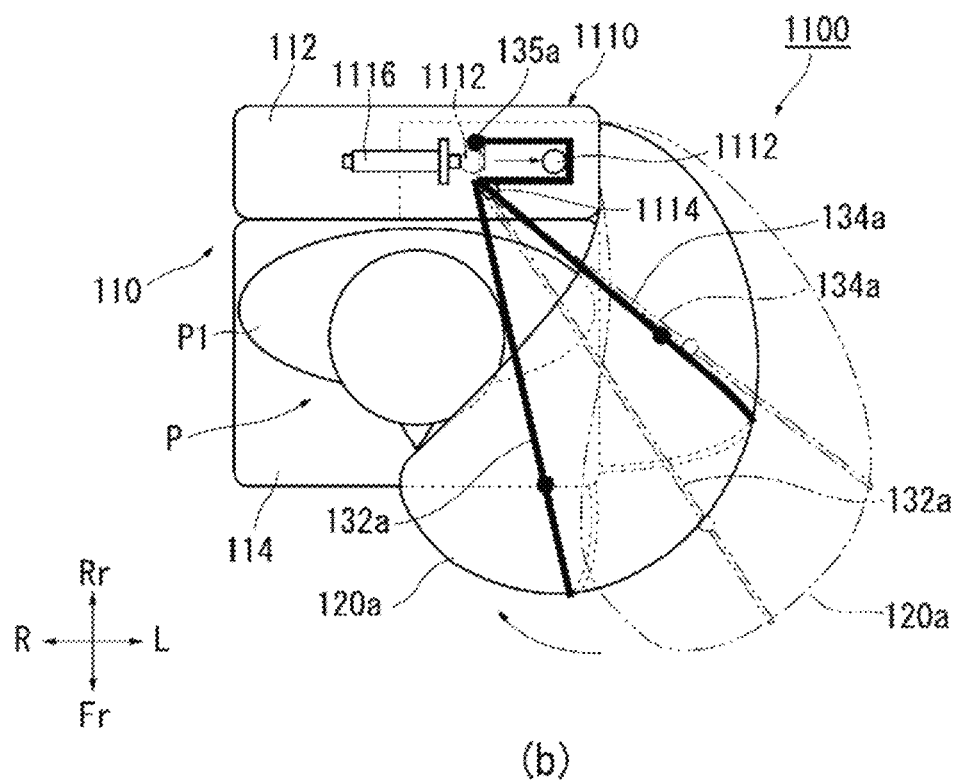

FIG. 12 is a diagram illustrating a passenger restraining device 1100 according to embodiment 8, and illustrates the seat 110 in a state as viewed from above. As illustrated in FIG. 12 (a), the passenger restraining device 1100 in embodiment 8 is provided with a biasing mechanism 1110 that biases the airbag 120a towards the passenger side. The tensile cloths are the same as in embodiment 6, and the descriptions thereof are omitted.

The biasing mechanism 1110 is configured by containing a shaft 1112 (first direction changing portion), a pin 1114 (second direction changing portion), and a push mechanism 1116. The shaft 1112 is provided so as to be moveable from the end portion of the left side to the center of the seat back portion 112. The pin 1114 is provided on the forward side of the shaft 1112 at the center of the seat back portion 112 in the left-right direction. The first tensile cloth 132a and the seat back portion 112 reach the airbag 120a from the center in the left-right direction of the seat back portion 112 via the shaft 1112 and the pin 1114. This push mechanism 1116 is a mechanism with a similar mechanism to that which rapidly moves the anchor portion of the seat belt and the like due to gas generated by a gas generator, and is not described in detail for the present invention.

As illustrated in FIG. 12 (a), the airbag 120a is deployed at a position slightly away from the passenger P in the initial stage of airbag 120a expansion and deployment. The push mechanism 1116 operates instantly at the same time or immediately following deployment, and the shaft 1112 is pushed towards the end portion of the left side of the seat back portion 112 by the push mechanism 1116. Thereby, the first tensile cloth 132a and the second tensile cloth 132a are pulled by the shaft 1112 between the pin 1114 and one end portion 135a, which is a connection point to the seat back portion 112. As a result, as illustrated in FIG. 12 (b), the airbag 120a is biased towards the passenger side due to the first tensile cloth 132a and the second tensile cloth 134a, and the passenger P is reliably restrained by the airbag 120a.

According to the biasing mechanism 1110 in embodiment 8, the same effect of biasing the airbag 120a towards the passenger P is obtained as with the biasing mechanism in the aforementioned embodiments, enabling a further increase in the passenger restraining ability of the airbag 120a. In addition, with the biasing mechanism 1110 in embodiment 8, the effect of biasing the airbag 120a towards the passenger P can be obtained with one airbag 120a alone, in the same manner as the biasing mechanism 910 in embodiment 6 and the biasing mechanisms 1010 in embodiment 7.

Note that in embodiment 8, the shaft 1112 is provided such that movement is possible between the end portion and the center of the left side of the seat back portion 112, and the push mechanism 1116 is illustrated with a configuration for pushing the shaft 1112 to the end portion of the left side of the seat back portion 112. This is due to the airbag 120*a* being provided on the left side of the passenger P. For the airbag 120*b* that is provided on the right side of the passenger P (see FIG. 1), the shaft 1112 is provided such that movement is possible between the end portion and the center of the left side of the seat back portion 112, and the push mechanism 1116 is configured to push the shaft 1112 toward the end portion of the right side of the seat back portion 112.

In addition, the biasing mechanism 910 in embodiment 6, the biasing mechanism 1010 in embodiment 7, and the biasing mechanism 1110 in embodiment 8 are illustrated with a configuration where the airbag 120*a* is provided with two tensile cloths, the first tensile cloth 132*a* and the second tensile cloth 134*a*, however, there is no limitation to this. The configuration can be such that one tensile cloth is provided for each airbag, or 3 or more tensile cloths are provided for one airbag.

(Tensile Cloth Variations)

Figure 13:
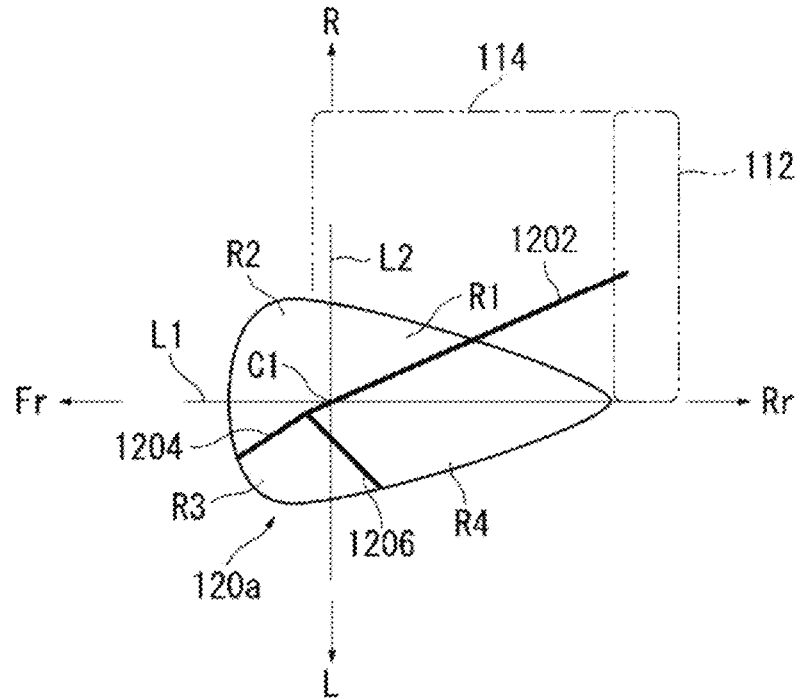
FIG. 13 is a diagram illustrating variations of the tensile cloth.
Figure 13:
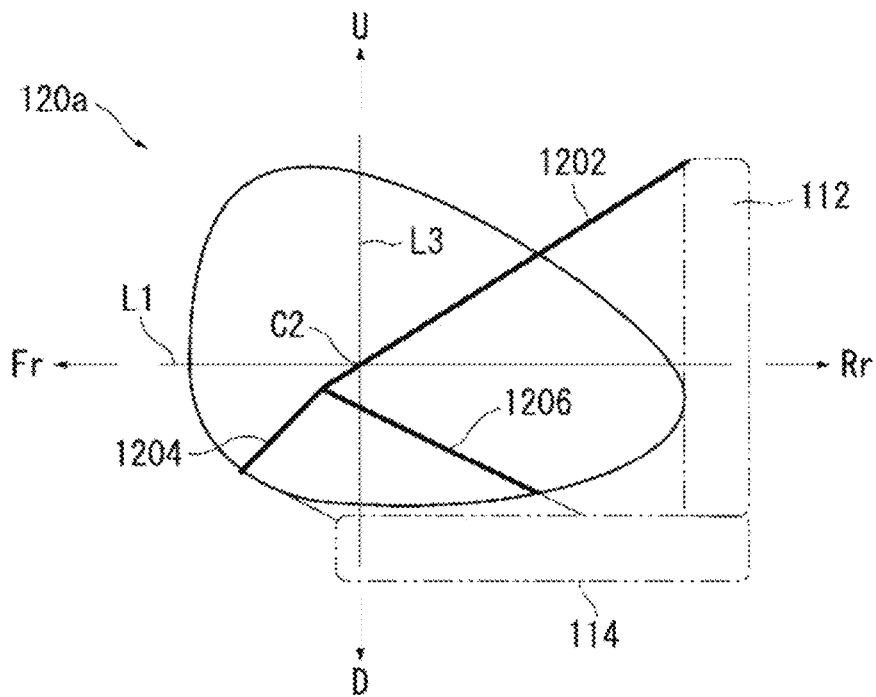
Figure 14:
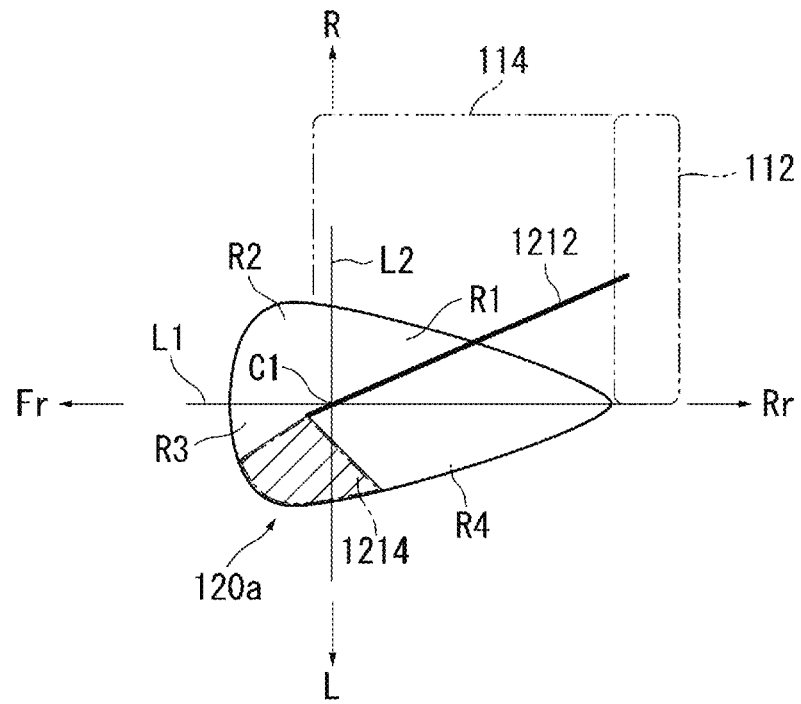
FIG. 14 is a diagram illustrating variations of the tensile cloth.
Figure 14:
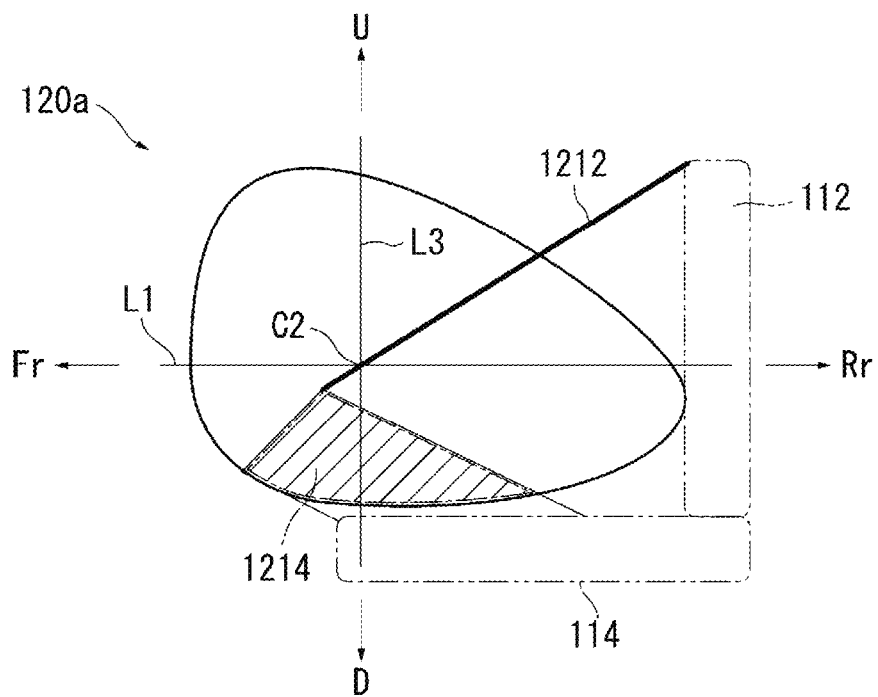

FIG. 13 and FIG. 14 are diagrams illustrating variations of the tensile cloths. FIG. 13 (*a*) and FIG. 14 (*a*) illustrate the airbag 120*a* in a state of being viewed from above. FIG. 13 (*b*) and FIG. 14 (*b*) are illustrations of the airbag 120*a* in a state of being viewed from the opposite side as the passenger P. Note, for easier understanding, in FIG. 13 and FIG. 14, the seat back portion 112 and the seat cushion portion 114 are schematically illustrated by dashed lines.

The examples of FIGS. 13 (*a*) and (*b*) provide a first tensile cloth 1202, a second tensile cloth 1204, and a third tensile cloth 1206 for the airbag 120*a*. These tensile cloths are deployed out of the seat (see FIG. 1) by the expansion and deployment of the airbag 120*a*. A portion of one of the first tensile cloth 1202, the second tensile cloth 1204, or the third tensile cloth 1206 is preferably provided so as to go through the region R3 that is on the opposite side of the first imaginary line L1 of the airbag 120*a* as the passenger and on the forward side of the second imaginary line L2 with regard to the vehicle.

In this example, the first tensile cloth 1202 is stretched across from the top surface of the seat back portion 112 to the region R3 that is on the opposite side of the first imaginary line L1 of the airbag 120*a* as the passenger and on the forward side of the second imaginary line L2 with regard to the vehicle. The second tensile cloth 1204 is stretched across with a forward inclination when moving downward, from the end portion of the first tensile cloth 1202 above the airbag 120*a* to the seat cushion portion 114. The third tensile cloth 1206 is stretched across with a rearward inclination while moving downward from the end part on the airbag 120*a* of the first tensile cloth 1202 to the seat cushion portion 114.

According to the examples in FIGS. 13 (*a*) and (*b*), the upper portion of the airbag 120*a* is held by the first tensile cloth 1202. The front side of the lower portion of the airbag 120*a* is held by the second tensile cloth 1204, and the rear side is held by the third tensile cloth 1206. Thereby, the airbag 120*b* can be received with good balance in the front-back direction and in the up-down direction during expansion and deployment.

The examples of FIGS. 14 (*a*) and (*b*) provide a first tensile cloth 1212 and a second tensile cloth 1214 for the airbag 120*a*. These tensile cloths are deployed out of the seat (see FIG. 1) by the expansion and deployment of the airbag 120*a*. A portion of one of the first tensile cloth 1212 or the second tensile cloth 1214 is preferably provided so as to go through the region R3 that is on the opposite side of the first imaginary line L1 of the airbag 120*a* as the passenger P and on the forward side of the second imaginary line L2 with regard to the vehicle.

In this example, the first tensile cloth 1212 is stretched across from the top surface of the seat back portion 112 to the region R3 that is on the opposite side of the first imaginary line L1 of the airbag 120*a* as the passenger and on the forward side of the second imaginary line L2 with regard to the vehicle. The second tensile cloth 1214 is a planar member which widens from the end portion of the first tensile cloth 1212 on the airbag 120*a* when moving downward, and is stretched across to the seat cushion portion 114. The second tensile cloth is a planar member in this manner, and therefore the tensile cloth can receive the airbag during expansion and deployment with the wide surface area thereof.

A preferred example of the present invention was described above while referring the accompanying drawings. However, the embodiment described above is a preferred example of the present invention, and other embodiments may be implemented or performed by various methods. In particular, unless described otherwise in the specification of the present application, the invention is not restricted to a shape, a size, configurational disposition, and the like of parts illustrated in detail in the accompanying drawings. Furthermore, expressions and terms used in the specification of the present application are used for providing the description, and thus the invention is not limited thereto, unless particularly described otherwise.

Therefore, it is obvious that a person with ordinary skill in the art can conceive various changed examples or modified examples within a scope described in the scope of the claims, which is understood to naturally belong to the technical scope of the present invention.

INDUSTRIAL APPLICABILITY

The present invention can be used in a passenger restraining device that restrains a passenger sitting on a seat of a vehicle.

The invention claimed is:

1. A passenger restraining device for restraining a passenger sitting on a seat of a vehicle, comprising:
   an airbag at least partially stored in a seat back portion of the seat and expandable and deployable to a side of the passenger sitting on the seat; and
   a plurality of tension cloths each extending from a seat back attachment point at a top of the seat back portion to a seat cushion attachment point; wherein:
   the plurality of tension cloths is deployable to an outside of the seat by expanding and deploying the airbag and stretchable from an upper surface of the seat back portion to a seat cushion portion,
   wherein the airbag when viewed in plan view from above during expansion and deployment, includes four regions demarcated by a first imaginary line extending in a front-rear direction of a vehicle through a center of a widest portion of the airbag on a straight line perpendicular to a left-right direction of the airbag and a second imaginary line orthogonal to the first imaginary line and extending in the left-right direction through a center of the first imaginary line in the left-right direction of the airbag, the four regions including a first region on a rear side of the second imaginary line and on a first side of the first imaginary line, the first side of the first imaginary line configured to be closer to the passenger, a second region on a front side of the second imaginary line and on the first side of the first imaginary line, a third region on the front side of the second imaginary line and on a second side of the first imaginary line, the second side opposite to the first side, and a fourth region on the rear side of the second imaginary line and on the second side of the first imaginary line, wherein the plurality of tension cloths diagonally extends over the airbag and passes through at least the first region to the third region upon deployment of the airbag, wherein the plurality of tension cloths has a collective width that increases from the first region to the third region upon deployment of the airbag, wherein the plurality of tension cloths extends over and contacts an upper surface of the airbag upon deployment of the airbag, and wherein the collective width of the plurality of tension cloths, upon deployment, has a maximum width at an area contacting the airbag; and wherein an attachment point width at both of a point of the seat back attachment point and the seat cushion attachment point is less than the maximum width.

2. The passenger restraining device according to claim 1, wherein the plurality of tension cloths eploys to the outside of the seat when a covering of the seat breaks open during expansion and deployment of the airbag.

3. The passenger restraining device according to claim 1, wherein at least a portion of the plurality of tension cloths is stored in a case provided in a side of the seat, and is deployable from the case to the outside of the seat during expansion and deployment of the airbag.

4. The passenger restraining device according to claim 1, wherein the plurality of tension cloths as viewed in plan view from above the airbag during expansion and deployment intersects with a contour line of the airbag in a region on an opposite side of the first imaginary line from the passenger and the front side of the second imaginary line.

5. The passenger restraining device according to claim 1, wherein the airbag is provided on a first lateral side of the seat and a further airbag is provided on a second lateral side of the seat such that the airbag and the further airbag are configured to expand and deploy on a left side and a right side of the passenger sitting on the seat, respectively.

6. The passenger restraining device according to claim 5, further comprising a biasing mechanism embedded in the seat back portion, which biases one of the airbag and the further airbag to a passenger side, the biasing mechanism comprising:

a shaft configured to be disposed at a position corresponding to a shoulder portion of the passenger on a side of one of the airbag and the further airbag in the seat back portion and capable of sliding in the seat back portion in the left-right direction; and a tether connected to the shaft and the other of the airbag and the further airbag.

7. The passenger restraining device according to claim 1, wherein the plurality of tension cloths are connected to the airbag at an intermediate portion of the plurality of tension cloths more forward than a center in a front-rear length when viewed in plan view from above the airbag during expansion and deployment.

8. The passenger restraining device according to claim 1, further comprising a biasing mechanism embedded in the seat back portion, which biases the airbag to a passenger side, the biasing mechanism, comprising a retractor that is connected to one end of the tension cloths of the plurality of tension cloths and winds the plurality of tension cloths, wherein the plurality of tension cloths are wound by the retractor during expansion and deployment of the airbag, such that the airbag is biased to the passenger side.

9. The passenger restraining device according to claim 8, the plurality of tension cloths includes: a first tension cloth; and a second tension cloth;

wherein:

the first tension cloth passes through at least a region on a side opposite of the first imaginary line from the passenger, and on a vehicle front side of the second imaginary line above the airbag from an upper portion of a seat back, the second tension cloth passes above the airbag more rearward than the first tension cloth and is connected to a seat cushion, and the biasing mechanism further comprises a direction changing part that changes a direction of pulling the first tension cloth and second tension cloth between the retractor and the airbag.

10. The passenger restraining device according to claim 8, wherein the plurality of tension cloths includes a first tension cloth and a second tension cloth which are provided so as to merge between the retractor and the airbag.

11. The passenger restraining device according to claim 1, further comprising a biasing mechanism embedded inside the seat back portion, which biases the airbag to a passenger side, the biasing mechanism comprising:

a direction changing part movable from one end portion of the seat back portion in the left-right direction to a center; and a pretensioner mechanism that pulls the direction changing part toward the center in the left-right direction during expansion and deployment;

wherein:

the plurality of tension cloths reaches the airbag from the one end portion of the seat back portion in the left-right direction through the direction changing part, and the pretensioner mechanism pulls the direction changing part during expansion and deployment of the airbag, such that the airbag is biased to the passenger side by the plurality of tension cloths.

12. The passenger restraining device according to claim 1, further comprising a biasing mechanism embedded inside the seat back portion, which biases the airbag to a passenger side, the biasing mechanism, comprising:

a first direction changing part movable from a vicinity of a center portion of the seat back portion to one end portion in the left-right direction;

a second direction changing part disposed more on a front side than the first direction changing part at the center portion of the seat back portion in the left-right direction; and a pushing mechanism that pushes the first direction changing part toward the one end portion of the seat back portion on a left or a right during expansion and deployment of the airbag;

wherein:
the plurality of tension cloths reaches the airbag from the center portion of the seat back portion in the left-right direction through the first direction changing part and second direction changing part, and
the pushing mechanism pushes the first direction changing part during expansion and deployment of the airbag, such that the airbag is biased to the passenger side by the plurality of tension cloths.

13. A passenger restraining device for restraining a passenger sitting on a seat of a vehicle, comprising:
an airbag at least partially stored in a seat back portion of the seat and expandable and deployable to a side of the passenger sitting on the seat; and
a plurality of tension cloths each extending from a seat back attachment point at a top of the seat back portion to a seat cushion attachment point; wherein:
the plurality of tension cloths is deployable to an outside of the seat by expanding and deploying the airbag, and stretchable from an upper surface of the seat back portion to a seat cushion portion,
wherein the airbag when viewed in plan view from above during expansion and deployment, includes four regions demarcated by a first imaginary line extending in a front-rear direction of a vehicle through a center of a widest portion of the airbag on a straight line perpendicular to a left-right direction of the airbag and a second imaginary line orthogonal to the first imaginary line and extending in the left-right direction through a center of the first imaginary line in the left-right direction of the airbag, the four regions including a first region on a rear side of the second imaginary line and on a first side of the first imaginary line, the first side of the first imaginary line configured to be closer to the passenger, a second region on a front side of the second imaginary line and on the first side of the first imaginary line, a third region on the front side of the second imaginary line and on a second side of the first imaginary line, the second side opposite to the first side, and a fourth region on the rear side of the second imaginary line and on the second side of the first imaginary line, wherein the plurality of tension cloths passes through at least the first region to the third region upon deployment of the airbag,
wherein an upper end of each tension cloth of the plurality of tension cloths is fixed to the seat back portion at a location inwardly spaced from the airbag such that the plurality of tension cloths extends from the upper end both laterally outward and downward across the airbag upon deployment of the airbag,
wherein the plurality of tension cloths diagonally extends over the airbag and passes through at least the first region to the third region upon deployment of the airbag,
wherein the plurality of tension cloths has a collective width that increases from the first region to the third region upon deployment of the airbag,
wherein the plurality of tension cloths extends over and contacts an upper surface of the airbag upon deployment of the airbag, and
wherein upon deployment of the airbag, the collective width of the plurality of tension cloths has a maximum width at an area contacting the airbag and an attachment point width at both of a point of the seat back attachment point and the seat cushion attachment point that is less than the maximum width.

14. A passenger restraining device for restraining a passenger sitting on a seat of a vehicle, comprising:
an airbag at least partially stored in a seat back portion of the seat and expandable and deployable to a side of the passenger sitting on the seat, the airbag provided on a first lateral side of the seat;
a further airbag provided on a second lateral side of the seat such that the airbag and the further airbag are configured to expand and deploy on a left side and a right side of the passenger sitting on the seat, respectively,
at least one tension cloth stored from the seat back portion of the seat to a seat cushion portion through a side surface of the airbag on a side opposite from the passenger; and
a biasing mechanism embedded in the seat back portion for biasing one of the airbag and the further airbag to a passenger side,
the biasing mechanism including a shaft and a tether, the shaft configured to be disposed at a position corresponding to a shoulder portion of the passenger on a side of one of the airbag and the further airbag in the seat back portion and capable of sliding in the seat back portion in a left-right direction, the tether connected to the shaft and the other of the airbag and the further airbag,
wherein the at least one tension cloth is deployable to an outside of the seat by expanding and deploying the airbag, and is stretchable from an upper surface of the seat back portion to the seat cushion portion,
wherein the airbag when viewed in plan view from above during expansion and deployment, includes four regions demarcated by a first imaginary line extending in a front-rear direction of a vehicle through a center of a widest portion of the airbag on a straight line perpendicular to a left-right direction of the airbag and a second imaginary line orthogonal to the first imaginary line and extending in the left-right direction through a center of the first imaginary line in the left-right direction of the airbag, the four regions including a first region on a rear side of the second imaginary line and on a first side of the first imaginary line, the first side of the first imaginary line configured to be closer to the passenger, a second region on a front side of the second imaginary line and on the first side of the first imaginary line, a third region on the front side of the second imaginary line and on a second side of the first imaginary line, the second side opposite to the first side, and a fourth region on the rear side of the second imaginary line and on the second side of the first imaginary line,
wherein the at least one tension cloth passes through at least the first region to the third region upon deployment of the airbag,
wherein the at least one tension cloth has a collective width that increases from the first region to the third region,
the at least one tension cloth is secured to the seat back portion at a position on an inner side of the shaft in the left-right direction,
during expansion and deployment of the airbag and the further airbag,
the at least one tension cloth is deployed to the outside of the seat, and is configured to be stretched to the seat cushion portion from a vicinity more inside than the shoulder portion of the passenger in the left-right direction of the upper surface of the seat back portion, when the tether is deployed to the outside of the seat during expansion and deployment of the airbag and the further airbag, the tether is pulled by the other of the airbag and the further airbag, and the shaft is configured to move in the seat back portion to a position corresponding to a further shoulder portion of the passenger, such that the at least one tension cloth is pulled by the shaft, and the one of the airbag and the further airbag is biased to the passenger.

* * * * *